United States Patent
Hisada et al.

(10) Patent No.: US 7,670,007 B2
(45) Date of Patent: Mar. 2, 2010

(54) PROJECTION DISPLAY, PROJECTION OPTICAL SYSTEM AND TRANSMISSION LENS OR FREE CURVED LENS

(75) Inventors: Takanori Hisada, Yokohama (JP); Hiroki Yoshikawa, Hiratsuka (JP); Tetsu Ohishi, Hiratsuka (JP); Koji Hirata, Yokohama (JP); Naoyuki Ogura, Machida (JP)

(73) Assignee: Hitachi, Ltd., Tokyo (JP)

( * ) Notice: Subject to any disclaimer, the term of this patent is extended or adjusted under 35 U.S.C. 154(b) by 834 days.

(21) Appl. No.: 11/473,087

(22) Filed: Jun. 23, 2006

(65) Prior Publication Data
US 2007/0139623 A1    Jun. 21, 2007

(30) Foreign Application Priority Data
Dec. 16, 2005    (JP)    ............... 2005-362594

(51) Int. Cl.
G03B 21/14    (2006.01)
G03B 21/28    (2006.01)
G02B 7/02    (2006.01)

(52) U.S. Cl. .................. 353/70; 353/77; 359/819

(58) Field of Classification Search ............ 353/70, 353/77, 78, 101; 359/242, 443, 448, 629, 359/630, 649, 720, 811, 818, 819
See application file for complete search history.

(56) References Cited

U.S. PATENT DOCUMENTS

| | | | |
|---|---|---|---|
| 5,553,052 A * | 9/1996 | Oono et al. | 369/112.17 |
| 5,709,445 A * | 1/1998 | Takamoto | 353/70 |
| 5,757,559 A * | 5/1998 | Nomura et al. | 359/819 |
| 5,820,240 A * | 10/1998 | Ohzawa | 353/70 |
| 6,220,712 B1 * | 4/2001 | Ohzawa | 353/70 |
| 6,295,172 B1 * | 9/2001 | Yamamichi et al. | 359/819 |
| 6,450,648 B1 * | 9/2002 | Ohzawa et al. | 353/70 |
| 6,452,727 B1 * | 9/2002 | Okuyama | 359/649 |
| 6,457,834 B1 * | 10/2002 | Cotton et al. | 353/122 |
| 6,590,720 B2 * | 7/2003 | Oba | 359/819 |
| 6,626,541 B2 * | 9/2003 | Sunaga | 353/69 |
| 6,710,945 B1 * | 3/2004 | Miranda | 359/819 |
| 6,747,818 B2 * | 6/2004 | Ohashi et al. | 359/806 |
| 6,779,897 B2 * | 8/2004 | Konno et al. | 353/99 |
| 6,950,240 B2 * | 9/2005 | Matsuo | 359/649 |
| 7,048,388 B2 * | 5/2006 | Takaura et al. | 353/99 |
| 7,086,742 B2 * | 8/2006 | Hatakeyama et al. | 353/70 |
| 7,182,466 B2 * | 2/2007 | Sunaga | 353/70 |
| 7,230,774 B2 * | 6/2007 | Suzuki et al. | 359/726 |
| 7,239,452 B2 * | 7/2007 | Kuwa | 359/649 |

(Continued)

FOREIGN PATENT DOCUMENTS

JP    2002-350774    12/2002

*Primary Examiner*—Diane I Lee
*Assistant Examiner*—Danell L Owens
(74) *Attorney, Agent, or Firm*—Antonelli, Terry, Stout & Kraus, LLP.

(57) ABSTRACT

A projection display is capable of suppressing both the trapezoidal distortion of an enlarged image projected on a screen by oblique projection and aberrations resulting from oblique projection and includes a projection optical system provided with lenses that can be easily manufactured and assembled. The projection optical system for obliquely projecting an image formed by a display device on the screen includes a free curved lens having a rotationally asymmetric free curved surface. The free curved lens has fringing parts having outlines of a shape coinciding with an arc of a circle having the center on the optical axis of the free curved lens.

17 Claims, 15 Drawing Sheets

U.S. PATENT DOCUMENTS

| | | | |
|---|---|---|---|
| 7,252,389 B2* | 8/2007 | Hatakeyama et al. | 353/70 |
| 7,286,448 B2* | 10/2007 | Suzuki et al. | 369/44.14 |
| 7,341,353 B2* | 3/2008 | Peterson et al. | 353/52 |
| 7,448,756 B2* | 11/2008 | Cho et al. | 353/37 |
| 7,467,872 B2* | 12/2008 | Hisada et al. | 353/77 |
| 7,503,661 B2* | 3/2009 | Masubuchi et al. | 353/99 |
| 2001/0050758 A1* | 12/2001 | Suzuki et al. | 353/69 |
| 2002/0057421 A1* | 5/2002 | Kurematsu et al. | 353/74 |
| 2002/0101665 A1* | 8/2002 | Ohashi et al. | 359/691 |
| 2002/0181130 A1 | 12/2002 | Ohzawa | |
| 2003/0107716 A1* | 6/2003 | Ogawa | 353/99 |
| 2003/0133082 A1* | 7/2003 | Sunaga | 353/70 |
| 2003/0202161 A1* | 10/2003 | Konno et al. | 353/70 |
| 2003/0214731 A1* | 11/2003 | Hayashide | 359/819 |
| 2004/0066561 A1* | 4/2004 | Nagata et al. | 359/676 |
| 2004/0184009 A1* | 9/2004 | Hatakeyama et al. | 353/70 |
| 2004/0196568 A1* | 10/2004 | Matsuo | 359/649 |
| 2005/0083491 A1* | 4/2005 | Suzuki et al. | 353/70 |
| 2006/0092385 A1* | 5/2006 | Hisada et al. | 353/70 |
| 2006/0109427 A1* | 5/2006 | Konno et al. | 353/78 |
| 2006/0126029 A1* | 6/2006 | Hatakeyama et al. | 353/70 |
| 2006/0139718 A1* | 6/2006 | Ishihara | 359/205 |
| 2006/0164605 A1* | 7/2006 | Kuwa | 353/78 |
| 2006/0176579 A1* | 8/2006 | Kuwa | 359/727 |
| 2007/0013875 A1* | 1/2007 | Matsuoka et al. | 353/70 |
| 2007/0013876 A1* | 1/2007 | Agatsuma et al. | 353/70 |
| 2007/0285780 A1* | 12/2007 | Imafuku et al. | 359/514 |

* cited by examiner

FIG.10
(a)
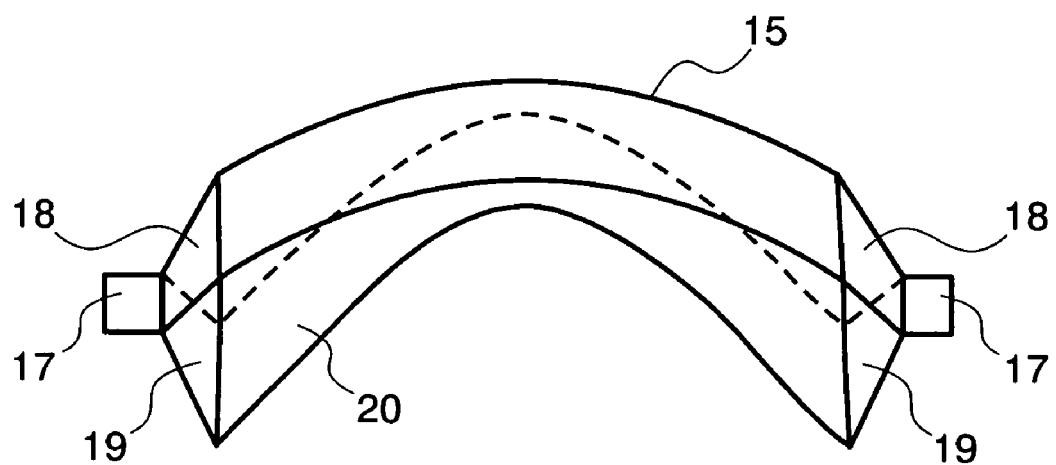
(b)
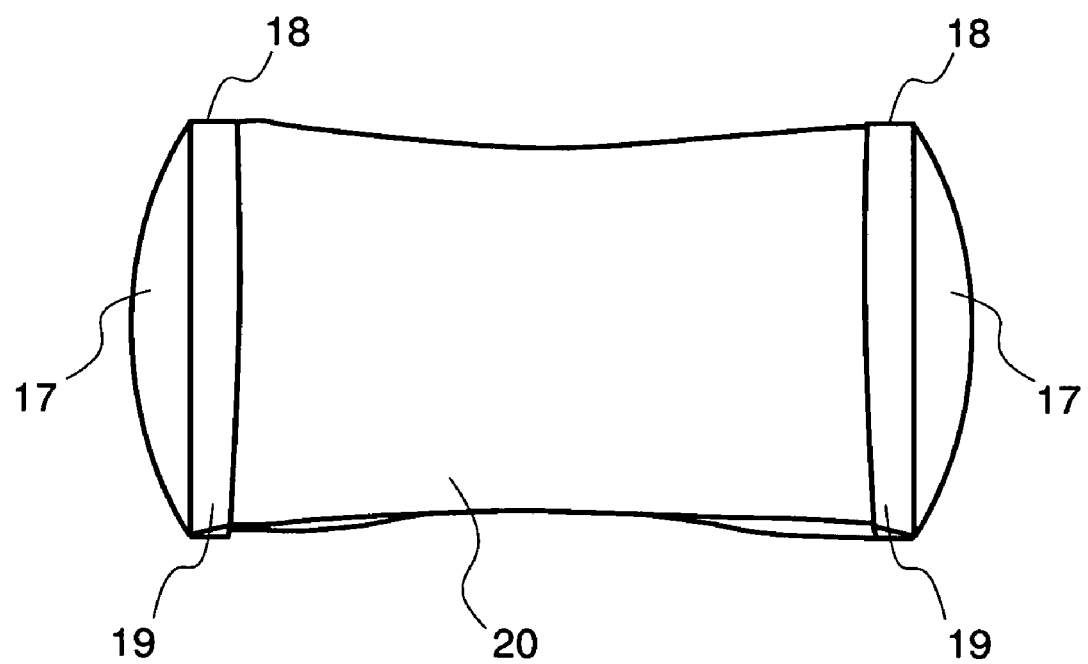

FIG.13
(a)
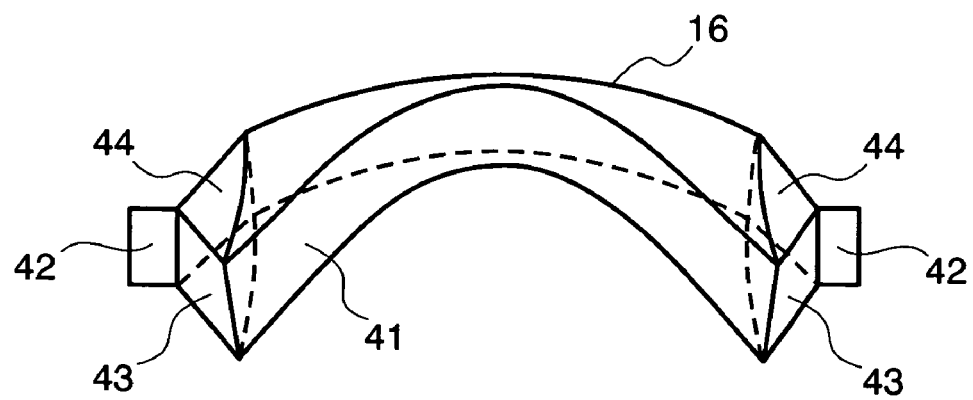
(b)
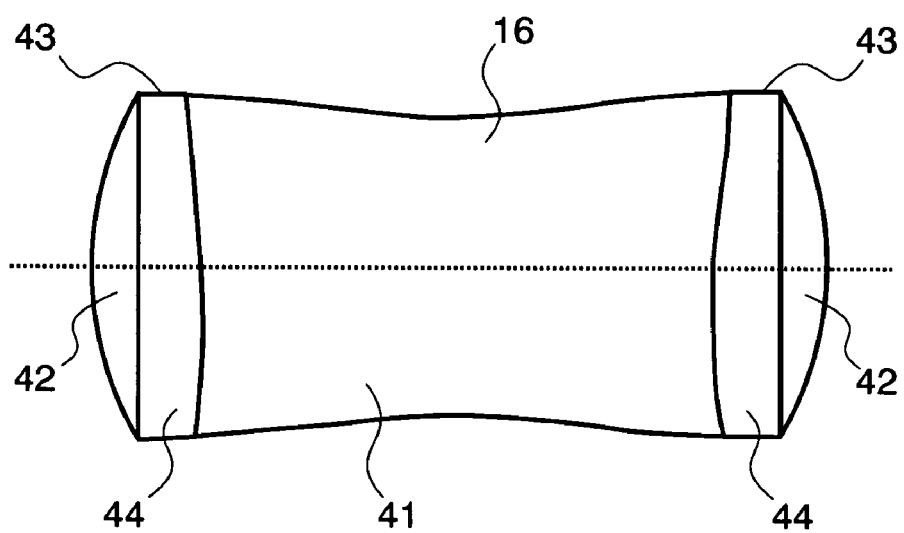

FIG.15
(a)
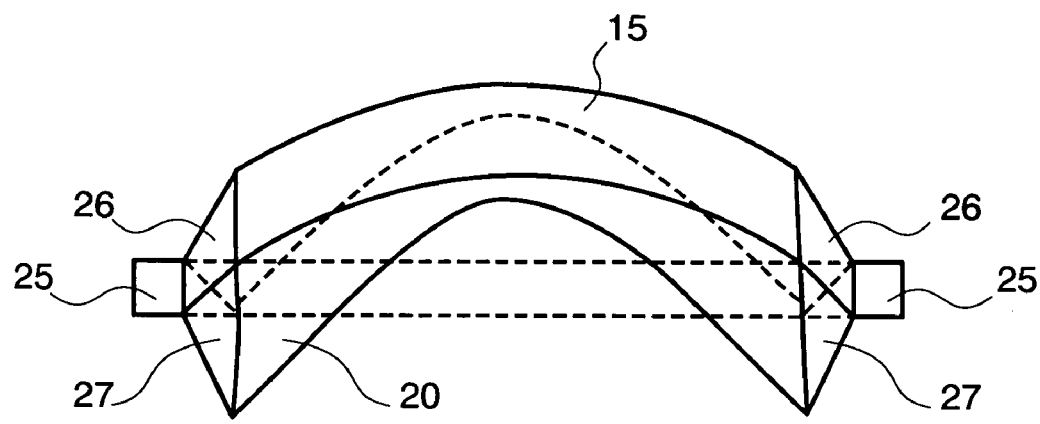
(b)
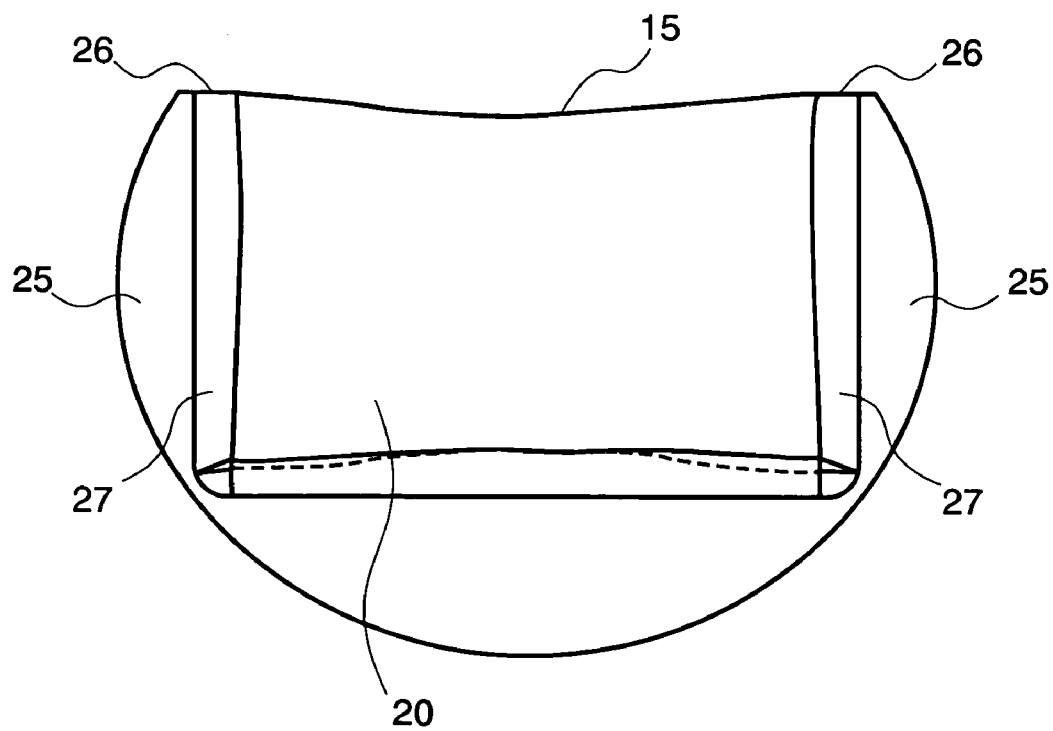

PROJECTION DISPLAY, PROJECTION OPTICAL SYSTEM AND TRANSMISSION LENS OR FREE CURVED LENS

BACKGROUND OF THE INVENTION

The present invention relates to a projection display capable of projecting a color image to display an enlarged color picture.

A projection display for displaying an enlarged image of an image formed by a display device using reflection or transmission liquid crystal panel or micromirrors is required to form a sufficiently enlarged image on a screen and to have a small depth. A projection optical unit and a projection display intended to meet such requirements are disclosed in JP-A 2001-264627. The known projection optical unit and the known projection display project an enlarged image obliquely on a screen. Such an image projection mode will be referred to as "oblique image projection mode". A method of optical adjustment of a projection display employing a curved mirror for oblique projection is disclosed in, for example, JP-A 2002-350774.

When an image is projected on a screen in an oblique projection mode at a predetermined angle to a normal to a major surface of the screen, for example, from a level below that of the screen, the image projected on the screen is subject to trapezoidal distortion and to optical aberration due to the difference in projection distance between light beams projected on an upper part of the screen and those projected on a lower part of the screen. A method of correcting such optical aberration disclosed in JP-A 2001-264627 corrects the trapezoidal distortion by a free curved mirror having a negative power and disposed between a projection optical system and the screen. The display device is translated greatly in a direction perpendicular to the optical axis relative to the coaxial projection optical system and the display device is tilted relative to a rotationally asymmetric projection optical system and is translated to correct the aberration.

When the aberration is corrected by such a method, an image displayed on the screen is likely to be longitudinally displaced. Therefore, a correcting mechanism for correcting the longitudinal displacement is necessary. A coaxial projection optical system required to have a large field angle needs many lenses and a large aperture. Any measures are not taken to cope with aberration and increase in distortion due to the deformation of optical parts caused by changes in ambient conditions.

Although an adjusting method that moves a free curved mirror is disclosed in JP-A 2002-350774, nothing is mentioned therein about aberration correction. Any measures are not taken to cope with increase in distortion due to the deformation of the free curved mirror caused by changes in ambient conditions Thus the known technique uses separate means respectively for correcting trapezoidal distortion and aberration and hence needs many lenses each having a big diameter. The known technique has difficulty in achieving both satisfactorily reducing trapezoidal distortion and aberration when an image is projected in an oblique projection mode, and forming a display in a small depth and/or lowering the lower end of a screen, which will be referred to as "set compaction". Any measures are not taken to cope with increase in aberration and distortion due to the deformation of optical parts caused by changes in ambient conditions. Both those known techniques do not mention about the shape of a free curved mirror that can be easily made.

SUMMARY OF THE INVENTION

It is an object of the present invention to provide a technique capable of displaying an image insignificantly subject to trapezoidal distortion and aberration, of achieving set compaction and of readily coping with increase in distortion and aberration due to the deformation of optical parts caused by changes in ambient conditions.

Another object of the present invention is to provide a projection optical system capable of achieving accurate oblique projection and a projection display.

A third object of the present invention is to provide a projection display capable of suppressing either or both of trapezoidal distortion and aberration when an image is projected on a screen in an enlarged picture in an oblique projection mode and of easily manufactured and assembled, and a projection optical system for the projection display.

A lens having a rotationally asymmetric free curved surface and included in a projection optical system for projecting an image formed by a display device in an enlarged picture at a predetermined angle has a fringing part coinciding with a part of a circle having its center on the optical axis of the lens.

BRIEF DESCRIPTION OF THE DRAWINGS

FIG. 10(a) is a top view of a free curved lens;

FIG. 10(b) is a front elevation of the free curved lens shown in FIG. 10(a);

FIG. 13(a) is a top view of another free curved lens;

FIG. 13(b) is a front elevation of the free curved lens shown in FIG. 13(a);

FIG. 15(a) is a top view of a free curved lens in a modification of the free curved lens shown in FIG. 10(a);

FIG. 15(b) is a front elevation of a free curved lens in another modification of the free curved lens shown in FIG. 10(a)

DESCRIPTION OF THE PREFERRED EMBODIMENTS

Figure 1:
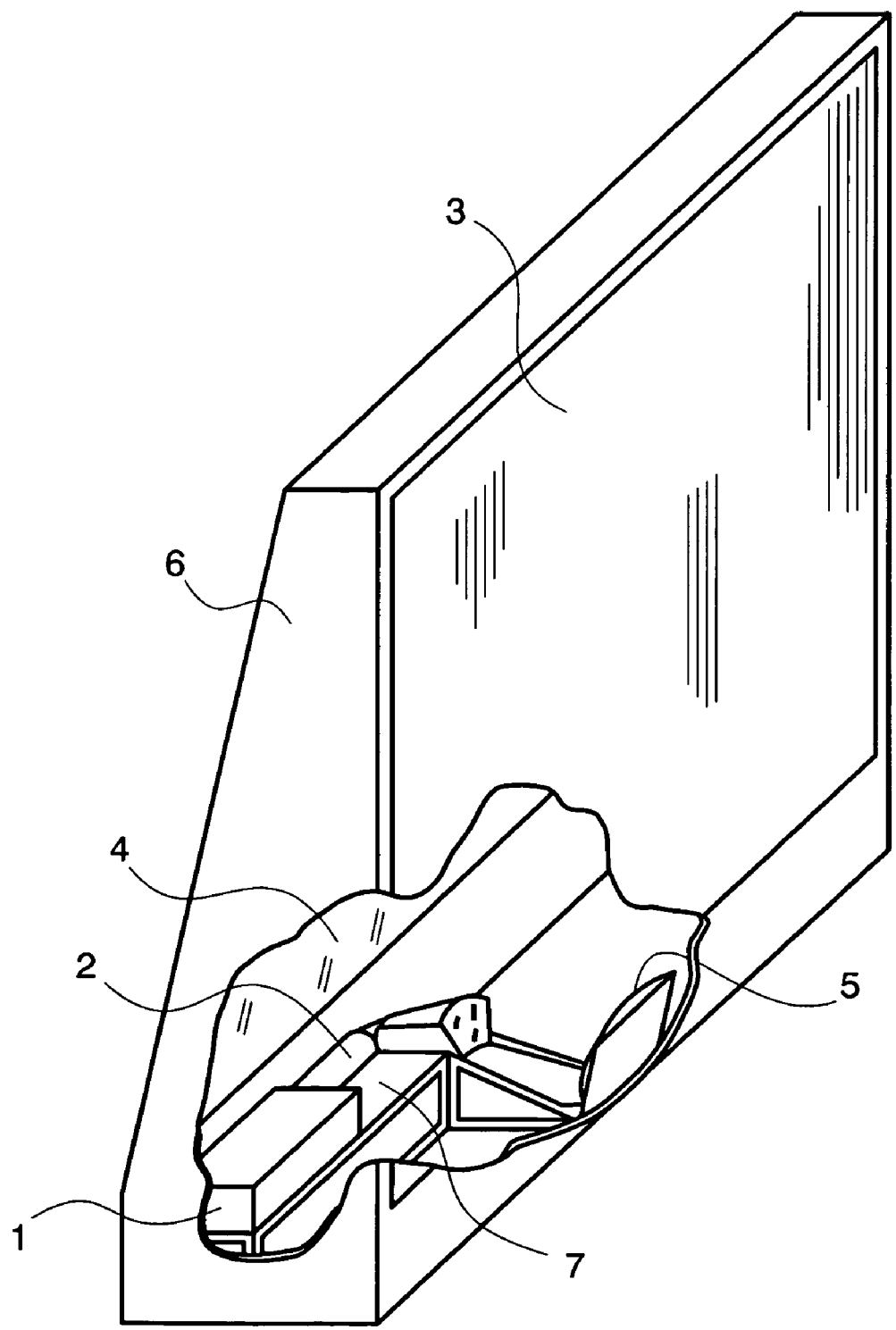
FIG. 1 is a partly cutaway perspective view of a projection display in a preferred embodiment according to the present invention.

Preferred embodiments of the present invention will be described with reference to the accompanying drawings. Referring to FIG. 1 showing a projection display in a preferred embodiment according to the present invention in a partly cutaway perspective view, an image generator 1 displays a small image. The image generator 1 is an optical modulator, such as a reflection or transmission liquid crystal panel or a display device provided with a plurality of micromirrors. The image generator 1 may be a projection CRT. An image generated by the image generator 1 is projected through a projection lens 2 included in a first optical system on a screen 3. A flat reflecting mirror 4 is disposed in an optical path between the projection lens 2 and the screen 3 to form the projection display in a small depth. A free curved mirror 5, which is a component of a second optical system, is interposed between the projection lens 2 and the flat reflecting mirror 4. Light traveled through the projection lens 2 is reflected by the free curved mirror 5 toward the flat reflecting mirror 4. The flat reflecting mirror 4 reflects the incident light toward the screen 3. Those optical components are held fixedly at predetermined positions, respectively, in a case 6. The image generator 1, the projection lens 2 and the free curved mirror 5 are fixedly mounted on a base 7. Component parts of a projection optical system will be described with reference to FIG. 2.

Figure 2:
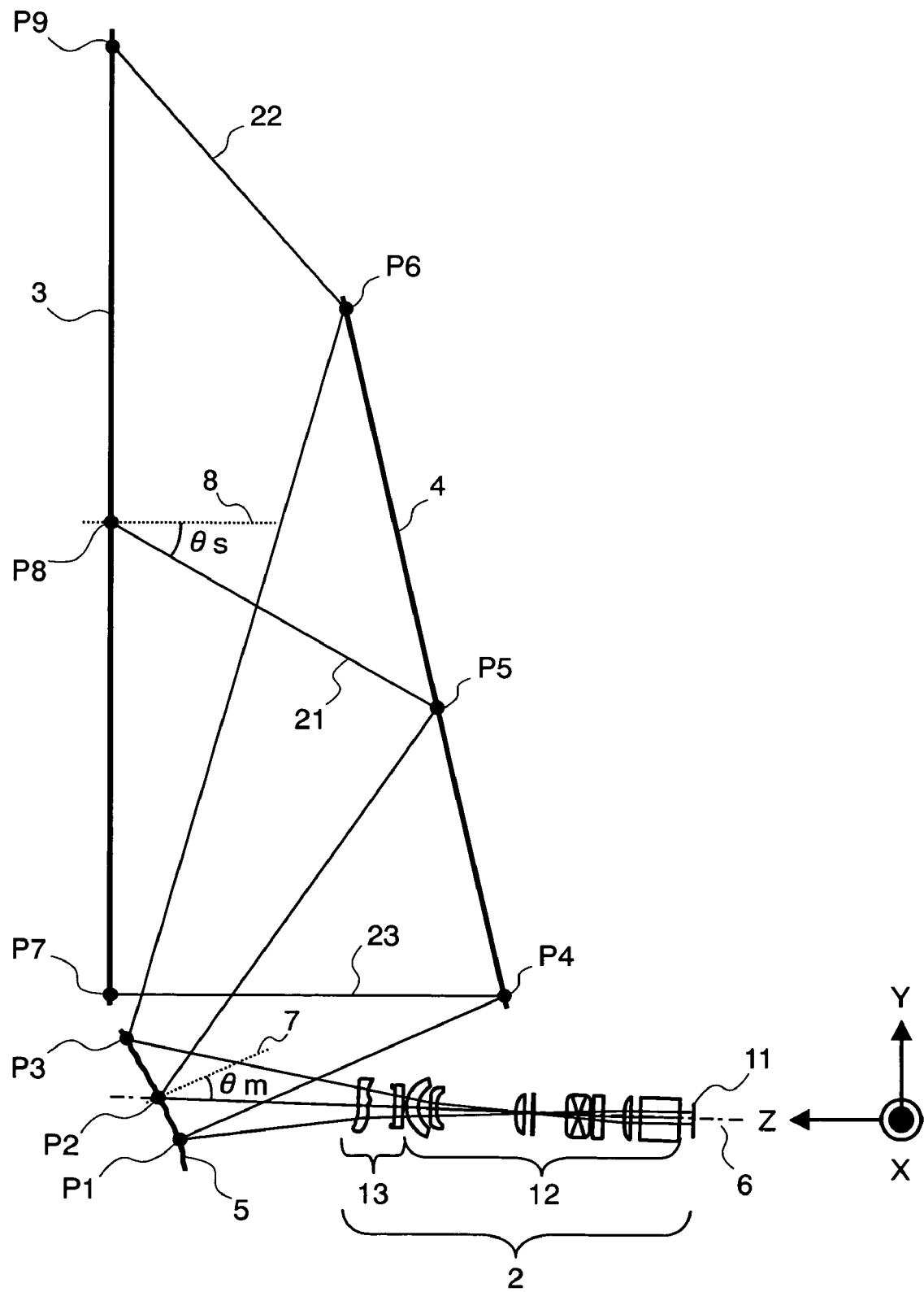
FIG. 2 is a diagrammatic view showing the basic construction of a projection optical system.

FIG. 2 is a diagrammatic view showing the basic optical construction of a rear projection display provided with a projection optical system in a preferred embodiment according to the present invention. FIG. 2 shows the projection optical system in a YZ-plane in an orthogonal coordinate system having the X-axis, the Y-axis and the Z-axis. The orthogonal coordinate system has its origin at the center of the screen of a display device 11, namely, the image generator 1. The Z-axis is parallel to a normal to the screen 3, the Y-axis is parallel to the short side, namely, the vertical side, of the screen 3, and the X-axis is parallel to the long side, namely, the horizontal side, of the screen 3.

Referring to FIG. 2, the projection lens 2 has a front lens group 12 including a plurality of refracting lenses each having rotationally symmetric surfaces and a rear lens group 13 including a free curved lens having at least one rotationally asymmetric free curved surface. Light emitted by the display device 11 travels through the front lens group 12 and the rear lens group 13 and falls on a free curved mirror 5. The free curved mirror 5 has a rotationally asymmetric free curved reflecting surface. The light is reflected by the free curved mirror 5 toward a flat reflecting mirror 4. The flat reflecting mirror 4 reflects the light toward a screen 3.

If the display device 11 is a light modulator, an illuminating system, not shown, including a lamp for illuminating the light modulator is necessary. The display device 11 may be of a three-plate system that synthesizes a plurality of pictures. In FIG. 2, a synthesizing optical system including a synthesizing prism needed by the display device 11 of a three-plate system is not shown.

In FIG. 2, the display device 11 look far from the screen 3 in the direction of a normal to the screen, namely a direction parallel to the Z-axis and the projection display look having a big depth because the projection lens 2 is long. Actually, a mirror, not shown, is disposed between the free curved mirror 5 and the rear lens group 13 of the projection lens 2, between the front lens group 12 and the rear lens group 13 of the projection lens 2 or in the front lens group 12 to form the projection display in a small depth by perpendicularly bending the optical axis of the projection lens 2 into the paper in FIG. 2.

As shown in FIG. 2, the display device 11 is disposed such that the center of the screen thereof is on the optical axis of the projection lens 2. Therefore, a light ray 21 emerging from the center of the screen of the display device 11 and traveling through the center of the entrance pupil of the projection lens 2 toward the center of the screen 3 travels substantially along the optical axis of the projection lens 2. The light ray 21 will be referred to as "center light ray". The center light ray 21 is reflected at a point P2 on the reflecting surface of the free curved mirror 5 and at a point P5 on the flat reflecting mirror 4 and falls obliquely on the screen 3 at a central point P8 on the screen 3. The angle between the center light ray 21 and a normal 8 to the screen 3 will be referred to as "oblique incidence angle $\theta_s$".

Thus the center light ray 21 traveling along the optical axis of the projection lens 2 falls obliquely on the screen 3; that is, the optical axis of the projection lens 2 is oblique to the screen 3. If light rays representing a rectangular shape fall obliquely on the screen 3, the rectangular shape is subject to trapezoidal distortion and various rotationally asymmetric aberrations occur. In the projection display in this embodiment, the trapezoidal distortion and the rotationally asymmetric aberrations are corrected by the rear lens group 13 of the projection lens 2 and the reflecting surfaces of the second optical system.

In FIG. 2, suppose that a light ray 22 emerges from the lower end of the screen of the display device 11, travels through the center of the entrance pupil of the projection lens 2 and falls on the screen 3 at a point P9 on the upper end of the screen 3 and corresponding to the center of the entrance pupil, and a light ray 23 emerges from the upper end of the screen of the display device 11, travels through the center of the entrance pupil of the projection lens 2 and falls on the screen 3 at a point P7 on the lower end of the screen 3 and corresponding to the center of the entrance pupil. As obvious from FIG. 2, the length of an optical path extending from a point P3 via a point P6 to the point P9 is longer than that of an optical path extending from a point P1 via a point P4 t the point P7. This means that the image point P9 on the screen 3 is farther from the projection lens 2 than the image point P7 on the screen 3. Therefore, the inclination of an image plane can be corrected by placing an object point on the screen of the display device 11 corresponding to the image point P9 on the screen 3 nearer to the projection lens 2 and placing an object point on the screen of the display device 11 corresponding to the image point P7 on the screen 3 farther from the projection lens 2. To correct the inclination of the image plane, the display device 11 is disposed such that a normal to the center of the screen of the display device 11 is inclined to the optical axis of the projection lens 2. More concretely, the display device 11 is disposed such that a normal to the screen thereof extends toward the screen 3 in the YZ-plane.

A known method tilts an object plane to tilt an image plane relative to the optical axis. When the field angle is a practically used angle, an image plane is distorted asymmetrically with respect to the optical axis when the object plane is tilted. Such a distortion cannot be corrected by a rotationally symmetric projection lens. The projection lens 2 in this embodiment is not rotationally symmetric. It is possible to deal with the asymmetric distortion of the image plane by using a rotationally asymmetric curved surface, namely, a free curved surface. Thus tilting the object plane can effectively reduce the low-order distortion of the image plane and can effectively assist aberration correction by a free curved surface.

Operations of the optical elements will be explained. The projection lens 2, namely, the first optical system, has the front lens group 12 including the lenses rotationally symmetric with respect to the optical axis and the rear lens group 13 including the rotationally asymmetric lens. The front lens group 12 is a main lens unit for projecting the screen of the display device 11 on the screen 3. The front lens group 12 corrects basic aberrations caused by a rotationally symmetric optical system. The rear lens group 13 of the projection lens 2 includes the rotationally asymmetric free curved lens.

The free curved lens is concave in a light emitting direction. The second optical system includes the free curved mirror 5 having a rotationally asymmetric free curved surface. The free curved mirror 5 has a convex part convex in a reflecting direction. The free curved mirror 5 is a rotationally asymmetric convex mirror. More specifically, in the free curved mirror 5, a part that reflects light toward a lower part of the screen 3 has a curvature greater than that of a part that reflects light toward an upper part of the screen 3.

In the free curved mirror 5, the part that reflects light toward a lower part of the screen 3 maybe convex in the reflecting direction the part that reflects light toward an upper part of the screen 3 may be concave in the reflecting direction. The free curved lens and the free curved mirror 5 correct mainly an aberration resulting from oblique projection. In this embodiment, the second optical system corrects mainly trapezoidal distortion and the rear lens group 13 of the projection lens 2, namely the first optical system, corrects mainly asymmetrical aberration, such as the distortion of the image plane.

In this embodiment, the first optical system includes at least one rotationally asymmetric free curved lens and the second optical system includes at least one rotationally asymmetric free curved mirror. Thus both trapezoidal distortion and aberration resulting from oblique projection can be corrected.

Desirably, the distance between the origin of the coordinate system designating the reflecting surface of the second optical system, namely, the point that reflects the light ray emerged from the center of the screen of the display device 11 in the reflecting surface, and the lens surface nearest to the screen 13 among those of the front lens group 12 is not shorter than five times the focal distance of the front lens group 12 of the projection lens 2. When this condition is satisfied, the reflecting surface of the second optical system can more effectively and satisfactorily correct trapezoidal distortion and aberration.

Since large free curved mirrors are very difficult to manufacture, it is important that the size of the free curved mirror 5 is smaller than a predetermined size. For example, the size of the flat reflecting mirror 4 is about 70% or above of the size of the screen 3. A large rear projection display provided with a screen of the type 50 or greater needs a reflecting mirror of 500 mm or above. It is very difficult to form such a large reflecting mirror in a free curved mirror. Therefore, in a rear projection display, it is not proper to form the flat reflecting mirror in a free curved mirror. In this embodiment, the free curved mirror 5 is formed in a size smaller than that of the flat reflecting mirror 3 and is disposed below the flat reflecting mirror 4. Image light traveled through the projection lens 2 and reflected sequentially by the free curved mirror 5 and the flat reflecting mirror 4 falls on the screen 3.

The idea of this embodiment applies also to a case where the optical path extending via the mirrors is bent in a plane containing the long side of the screen. Thus trapezoidal distortion resulting from oblique projection can be corrected without eccentrically arranging the lenses of the projection lens 2 having refractive surfaces, without increasing the diameters of the lenses of the projection lens 2 or without increasing the number of the lenses of the projection lens 2. Thus the projection optical unit can be formed in a small depth and can be easily manufactured. The projection display in this embodiment has a small depth and can be formed in compact construction having a lower part lying under the screen and having a low height. The optical system of the projection display includes the small free curved mirror and can be easily manufactured.

Optical systems embodying the present invention will be numerically described. Numerical data on an optical system will be described by way of example with reference to FIGS. 3 to 7 and Tables 1 to 4.

Figure 3:
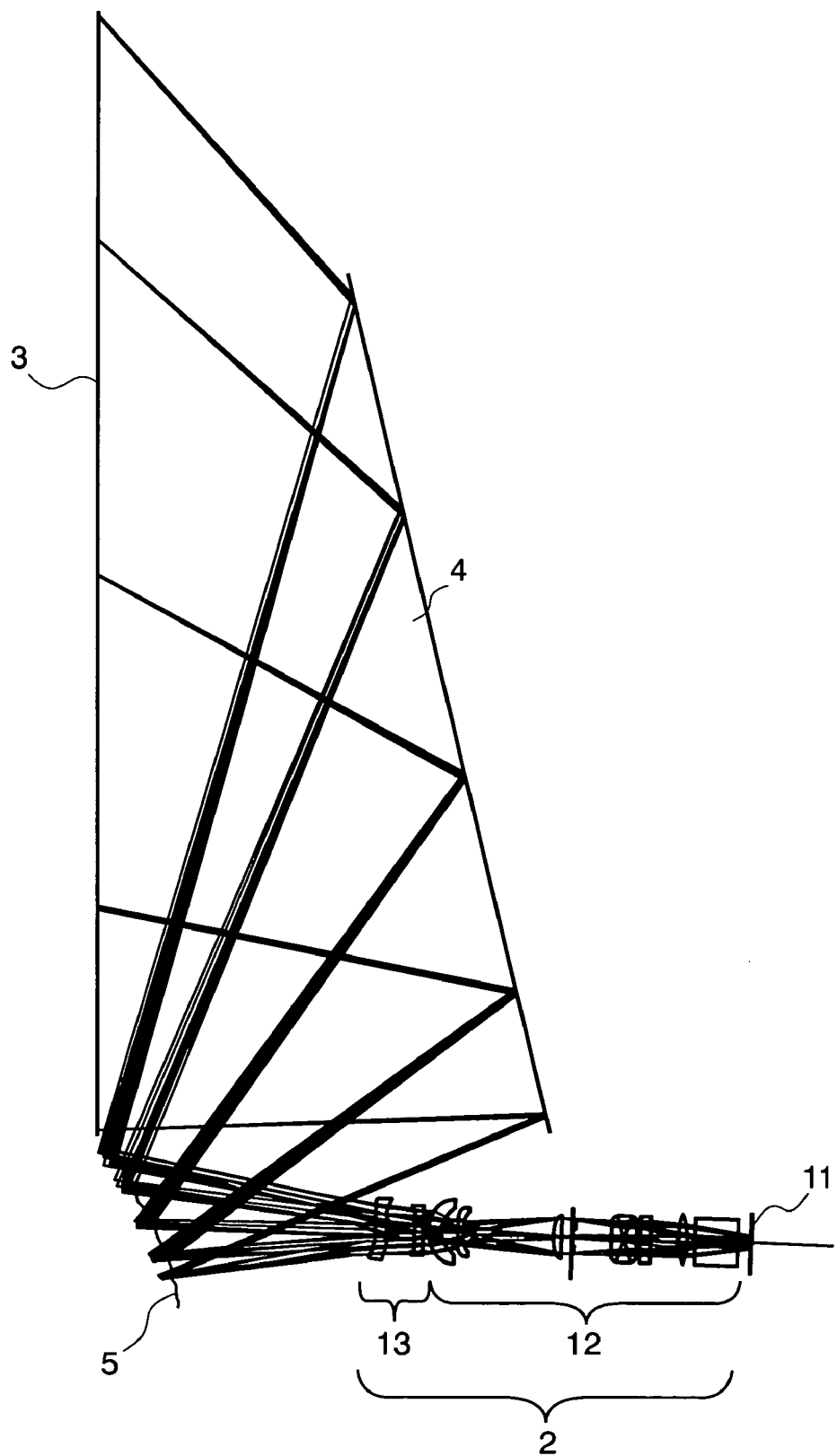
FIG. 3 is a diagrammatic view showing optical paths in the projection optical system shown in FIG. 2 in a YZ-plane.
Figure 4:
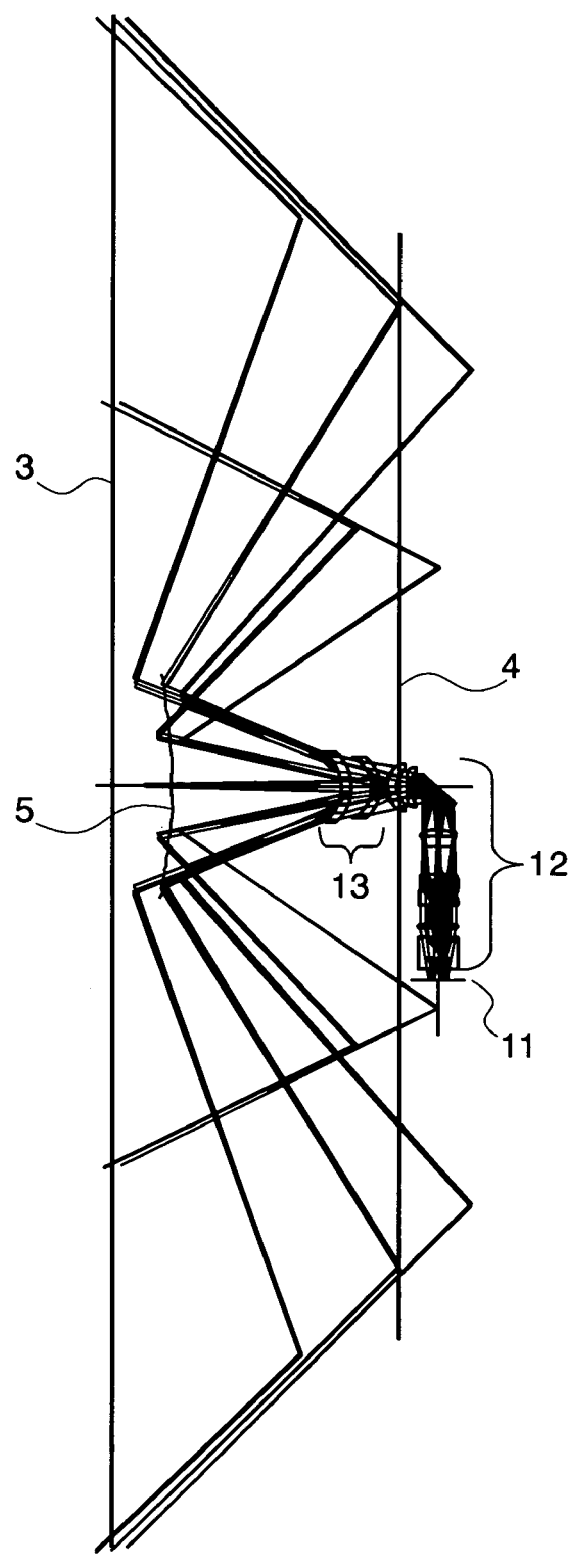
FIG. 4 is a diagrammatic view showing optical paths in the projection optical system shown in FIG. 2 in an XZ-plane.

FIGS. 3 and 4 are diagrammatic views showing optical paths in a projection optical system in a first numerical example. FIG. 3 shows optical paths in the projection optical system in a YZ-plane and FIG. 4 shows optical paths in an XZ-plane in the orthogonal coordinate system defined by the X-axis, the Y-axis and the Z-axis. In the projection optical system shown in FIG. 1, a deflecting mirror is placed in the front lens group of the projection lens 2 to bend the optical path in a direction parallel to the X-axis. The deflecting mirror is not shown in FIG. 3. In FIG. 3, the projection optical system is developed in a direction parallel to the Z-axis. FIG. 4 shows the deflecting mirror and the bent optical paths. The position and the angular position of the deflecting mirror are somewhat optional. The deflecting mirror does not affect the functions of the optical elements. Therefore, the description of the deflecting mirror will be omitted.

Referring to FIG. 3, light emitted by a display device 11 sown in a lower part of FIG. 3 travels through a front lens group 12 including lenses having only rotationally symmetric surfaces of a projection lens 2. Then, the light travels through a rear lens group 13 including a rotationally asymmetric free curved lens and falls on the reflecting surface of a free curved mirror 5. The light reflected by the free curved mirror 5 is reflected by a flat reflecting mirror 4 and falls on a screen 3.

All the lenses of the front lens group 12 of the projection lens 2 have rotationally symmetric refracting surfaces, respectively. The four refracting surfaces of those refracting surfaces are rotationally symmetric a spherical surfaces and the rest are spherical surfaces. Each of the rotationally symmetrical a spherical surface is designated in a local cylindrical coordinate system by the following expression.

$$Z = \frac{cr^2}{1+\sqrt{1-(1+k)c^2r^2}} + A \cdot r^4 + B \cdot r^6 + C \cdot r^8 + \\ D \cdot r^{10} + E \cdot r^{12} + F \cdot r^{14} + G \cdot r^{16} + H \cdot r^{18} + J \cdot r^{20} \tag{1}$$

where r is distance from the optical axis, Z is the amount of sag, c is the curvature of the top, k is cone constant and A t J are coefficients.

A free curved lens included in a rear lens group 13 of the projection lens 2 is designated by the following expression in a local orthogonal coordinate system defined by the x-axis, the y-axis and the z-axis.

$$Z = \frac{cr^2}{1+\sqrt{1-(1+k)c^2r^2}} + \sum_m \cdot \sum_n (C(m,n) \cdot x^m \cdot y^n) \tag{2}$$

where Z is the amount of sag in the free curved surface with respect to a direction perpendicular to the x-axis and the y-axis, c is the curvature of the top, r is distance from the origin in a plane parallel to the xy-plane, k is cone constant and C (m, n) is coefficient.

TABLE 1

Figure 7:
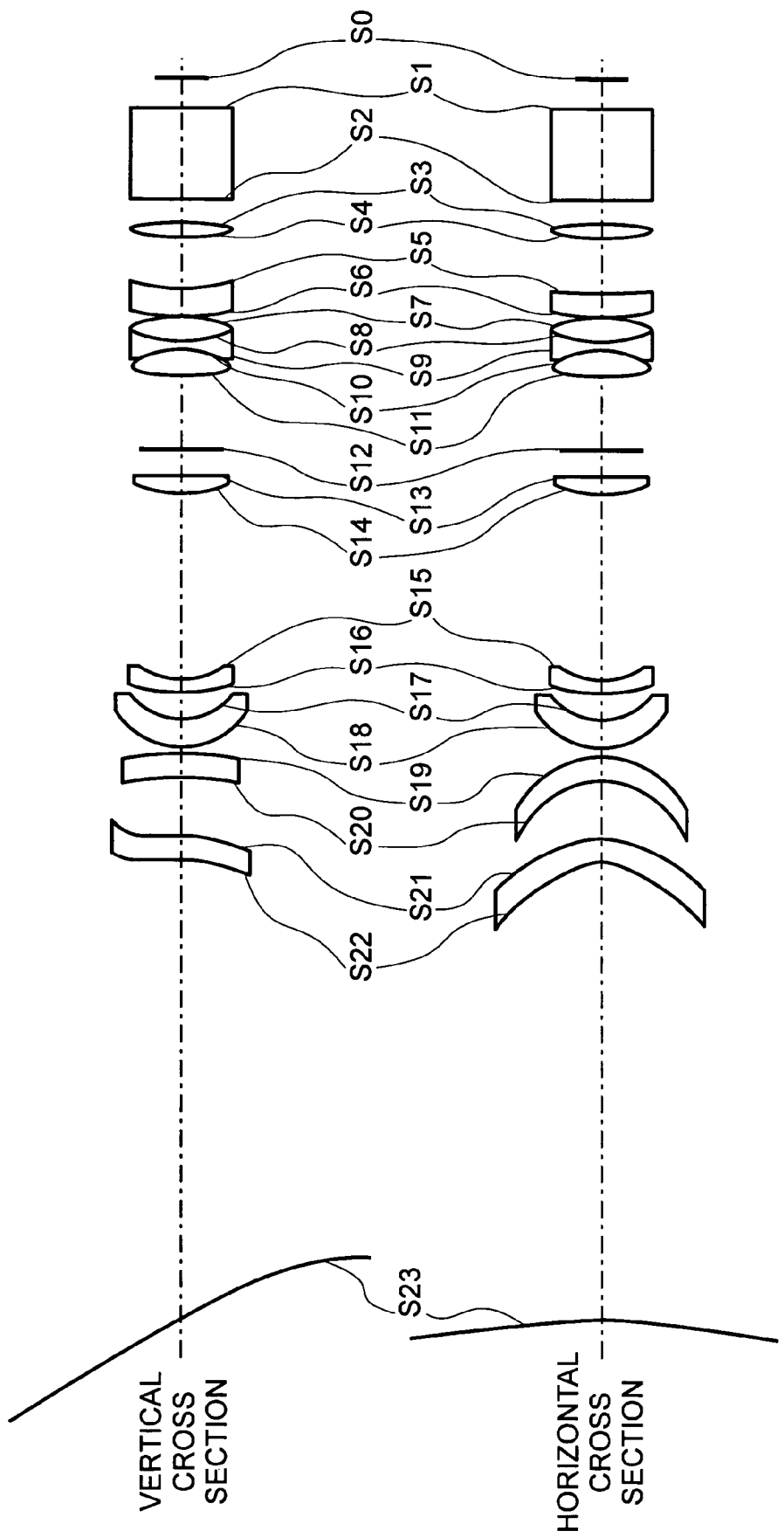
FIG. 7 is a diagrammatic view showing the arrangement of optical parts of the projection optical system.

| Surface | Rd | TH | nd | vd |
|---|---|---|---|---|
| S0 | Infinity | 10.00 | | |
| S1 | Infinity | 31.34 | 1.51827 | 48.0 |
| S2 | Infinity | 7.06 | | |
| S3 | 246.358 | 4.65 | 1.85306 | 17.2 |
| S4 | −84.858 | 18.00 | | |
| S5 * | −83.708 | 9.00 | 1.49245 | 42.9 |
| S6 * | −75.314 | 0.10 | | |
| S7 | 41.651 | 9.32 | 1.49811 | 60.9 |
| S8 | −42.282 | 2.50 | 1.76014 | 20.0 |
| S9 | 29.550 | 0.10 | | |
| S10 | 29.476 | 9.00 | 1.49811 | 60.9 |
| S11 | −79.153 | 25.90 | | |
| S12 | Infinity | 9.10 | | |
| S13 | −265.353 | 6.00 | 1.85306 | 17.2 |
| S14 | −53.869 | 65.00 | | |
| S15 | −24.898 | 4.19 | 1.74702 | 33.2 |
| S16 | −58.225 | 9.00 | | |
| S17 * | −27.332 | 10.00 | 1.49245 | 42.9 |
| S18 * | −32.424 | 2.50 | | |
| S19 # | Infinity | 8.00 | 1.49245 | 42.9 |
| S20 # | Infinity | 20.51 | | |
| S21 # | Infinity | 8.00 | 1.49245 | 42.9 |
| S22 # | Infinity | 160.99 | | |
| S23 # | Infinity | −400.00 | REFL | |
| S24 | Infinity | 305.00 | REFL | |
| S25 | Infinity | — | | | the reflecting surface of the free curved mirror 5 and the symbol S24 indicates the entrance surface of the screen 3, not shown in FIG. 7, namely, the image plane. In FIG. 7, an upper diagram is a sectional view of the first and the second optical system taken on a vertical plane and a lower diagram is a sectional view of the first and the second optical system taken on a horizontal plane.

In Table 1, a symbol Rd indicates curvature. The curvature Rd of a curved surface having its center of curvature on the left side in FIG. 3 is positive and on the right side in FIG. 3 is negative. In Table 1, a symbol TH indicates intersurface distance between the respective tops of the adjacent lens surfaces. The intersurface distance TH between a first lens surface and a second lens surface on the left side of the first lens surface in FIG. 3 is positive and the intersurface distance TH between a first lens surface and a second lens surface on the right side of the first lens surface in FIG. 3 is negative. In Table 1, symbols S5, S6, S17 and S18 indicate rotationally symmetric a spherical surfaces, respectively, and asterisk (*) is attached to those symbols to facilitate finding those rotationally symmetric a spherical surfaces. Table 2 shows coefficients for functions defining those rotationally symmetric a spherical surfaces.

TABLE 2

| Surface | | | | Aspheric surface coefficient | | | | |
|---|---|---|---|---|---|---|---|---|
| S5 | K | −11.7678542 | C | −1.159E−11 | F | 2.98642E−20 | J | −1.255E−26 |
| | A | −2.7881E−06 | D | −3.2834E−14 | G | 1.05201E−21 | | |
| | B | 9.67791E−09 | E | 1.09359E−16 | H | 1.96001E−24 | | |
| S6 | K | −5.4064901 | C | 2.0324E−12 | F | 3.0211E−19 | J | −1.4982E−26 |
| | A | 6.14967E−07 | D | −2.2078E−14 | G | 4.30049E−22 | | |
| | B | 4.60362E−09 | E | −8.0538E−17 | H | 4.79618E−24 | | |
| S17 | K | 1.016429122 | C | −9.0262E−11 | F | −1.0521E−18 | J | −6.0837E−26 |
| | A | −1.1068E−05 | D | −1.3984E−13 | G | −8.1239E−23 | | |
| | B | 7.21301E−08 | E | 3.1153E−16 | H | 3.86174E−23 | | |
| S18 | K | 0.742867686 | C | −2.2719E−11 | F | 1.09398E−19 | J | 9.02232E−29 |
| | A | 1.51788E−07 | D | −4.6853E−14 | G | 1.62146E−22 | | |
| | B | 2.10472E−08 | E | 2.9666E−17 | H | −3.0801E−25 | | |

Table 1 shows numerical data on the projection optical system in this embodiment. FIGS. 3 and 4 show optical paths in the projection optical system defined by numerical data shown in Tables 1 to 4. In Table 1, symbols S0 to S23 in Table 1 indicate optical elements S0 to S23 shown in FIG. 7. For example, the symbol S0 indicates the screen of the display device 11, namely, an object plane, the symbol S23 indicates In Table 1, symbols S19 to S22 indicate the refracting surfaces of the free curved lenses included in the rear lens group 13 of the projection lens 2, respectively, the symbol S23 indicates the reflecting surface of the free curved mirror 5. A sharp (#) is attached to the symbols indicating optical elements having a free curved surface. Table 3 shows coefficients for functions defining the five free curved surfaces.

TABLE 3

| Surface | | | | | Free-form surface coefficient | | | |
|---|---|---|---|---|---|---|---|---|
| S19 | | | | C(4, 1) | 5.38933E−07 | C(2, 5) | −1.2381E−09 | C(4, 5) | −7.4126E−14 |
| | K | 0 | | C(2, 3) | 8.33432E−07 | C(0, 7) | 1.13944E−09 | C(2, 7) | 2.05074E−12 |
| | C(2, 0) | 0.013500584 | | C(0, 5) | −4.6367E−08 | C(8, 0) | 3.87771E−12 | C(0, 9) | −9.2166E−13 |
| | C(0, 2) | 0.003493312 | | C(6, 0) | −6.2643E−09 | C(6, 2) | 1.04779E−11 | C(10, 0) | −2.5867E−15 |
| | C(2, 1) | −0.00083921 | | C(4, 2) | −2.2449E−08 | C(4, 4) | 1.80038E−11 | C(8, 2) | −8.7122E−15 |
| | C(0, 3) | −0.00032098 | | C(2, 4) | −5.6706E−08 | C(2, 6) | 5.23019E−11 | C(6, 4) | 2.85321E−14 |
| | C(4, 0) | 8.59459E−06 | | C(0, 6) | 9.69952E−10 | C(0, 8) | 1.69253E−11 | C(4, 6) | −8.5084E−14 |
| | C(2, 2) | 2.14814E−06 | | C(6, 1) | −1.1968E−10 | C(8, 1) | −2.7E−14 | C(2, 8) | 1.25198E−13 |
| | C(0, 4) | 7.54355E−06 | | C(4, 3) | −1.3638E−09 | C(6, 3) | 7.30978E−13 | C(0, 10) | −5.6277E−14 |

TABLE 3-continued

| Surface | | | | Free-form surface coefficient | | | | |
|---|---|---|---|---|---|---|---|---|
| S20 | | | C(4, 1) | 7.49262E−07 | C(2, 5) | −5.7462E−10 | C(4, 5) | −3.6141E−13 |
| | K | 0 | C(2, 3) | 1.19039E−06 | C(0, 7) | 1.27396E−09 | C(2, 7) | 8.54188E−14 |
| | C(2, 0) | 0.015488689 | C(0, 5) | −1.2953E−07 | C(8, 0) | −4.7746E−12 | C(0, 9) | −5.3469E−13 |
| | C(0, 2) | 0.006553414 | C(6, 0) | 5.115E−10 | C(6, 2) | 7.32855E−12 | C(10, 0) | 8.92545E−17 |
| | C(2, 1) | −0.00116756 | C(4, 2) | −2.1936E−08 | C(4, 4) | 5.30157E−11 | C(8, 2) | −5.3434E−15 |
| | C(0, 3) | −0.00033579 | C(2, 4) | −5.9543E−08 | C(2, 6) | 5.05014E−11 | C(6, 4) | 1.96533E−14 |
| | C(4, 0) | 7.5015E−06 | C(0, 6) | 2.03972E−08 | C(0, 8) | −2.1894E−11 | C(4, 6) | −1.3923E−13 |
| | C(2, 2) | −2.5728E−06 | C(6, 1) | 1.16701E−11 | C(8, 1) | −1.2515E−13 | C(2, 8) | 1.06322E−13 |
| | C(0, 4) | −1.3543E−06 | C(4, 3) | −1.6198E−09 | C(6, 3) | 7.64489E−13 | C(0, 10) | −4.6602E−15 |
| S21 | | | C(4, 1) | −1.0379E−07 | C(2, 5) | 2.81743E−10 | C(4, 5) | −8.1775E−15 |
| | K | 0 | C(2, 3) | 3.0082E−08 | C(0, 7) | 6.05663E−10 | C(2, 7) | 3.06022E−14 |
| | C(2, 0) | 0.015096874 | C(0, 5) | 7.95521E−08 | C(8, 0) | 8.39381E−13 | C(0, 9) | −9.1775E−13 |
| | C(0, 2) | 0.009982808 | C(6, 0) | −1.3911E−09 | C(6, 2) | 1.98531E−12 | C(10, 0) | −7.8543E−17 |
| | C(2, 1) | 0.000358347 | C(4, 2) | 9.33292E−10 | C(4, 4) | 1.37477E−11 | C(8, 2) | −8.9588E−16 |
| | C(0, 3) | 0.000209267 | C(2, 4) | 3.54468E−09 | C(2, 6) | −1.0671E−11 | C(6, 4) | −6.0768E−15 |
| | C(4, 0) | −3.8593E−07 | C(0, 6) | 4.1615E−09 | C(0, 8) | 9.04109E−12 | C(4, 6) | −1.9528E−14 |
| | C(2, 2) | −6.8336E−06 | C(6, 1) | −1.2331E−11 | C(8, 1) | 2.48401E−14 | C(2, 8) | 2.6781E−14 |
| | C(0, 4) | −2.2455E−05 | C(4, 3) | −2.3367E−10 | C(6, 3) | 6.92603E−14 | C(0, 10) | −1.4324E−14 |
| S22 | | | C(4, 1) | −3.6973E−07 | C(2, 5) | 4.8045E−10 | C(4, 5) | −2.9795E−13 |
| | K | 0 | C(2, 3) | −3.0682E−07 | C(0, 7) | 1.43328E−10 | C(2, 7) | −2.5306E−14 |
| | C(2, 0) | 0.022813527 | C(0, 5) | 4.12093E−08 | C(8, 0) | −2.0707E−12 | C(0, 9) | −3.9401E−13 |
| | C(0, 2) | 0.012060543 | C(6, 0) | 4.07969E−09 | C(6, 2) | −4.9221E−12 | C(10, 0) | 6.88651E−16 |
| | C(2, 1) | 0.000638931 | C(4, 2) | 8.5986E−09 | C(4, 4) | −2.3681E−12 | C(8, 2) | 1.55006E−15 |
| | C(0, 3) | 0.000196027 | C(2, 4) | 2.1713E−08 | C(2, 6) | −2.1567E−11 | C(6, 4) | −1.4674E−15 |
| | C(4, 0) | −7.1204E−06 | C(0, 6) | 1.63499E−08 | C(0, 8) | −2.3679E−12 | C(4, 6) | −9.9822E−15 |
| | C(2, 2) | −1.269E−05 | C(6, 1) | 1.38704E−10 | C(8, 1) | −5.7167E−15 | C(2, 8) | 2.72925E−14 |
| | C(0, 4) | −2.5184E−05 | C(4, 3) | 2.02372E−10 | C(6, 3) | −9.0337E−14 | C(0, 10) | −1.1966E−14 |
| S23 | | | C(4, 1) | −1.1083E−09 | C(2, 5) | −4.9118E−14 | C(4, 5) | −5.4918E−19 |
| | K | 0 | C(2, 3) | −5.7768E−10 | C(0, 7) | 8.12546E−14 | C(2, 7) | −2.2569E−18 |
| | C(2, 0) | 0.001597194 | C(0, 5) | 1.60076E−10 | C(8, 0) | −7.486E−17 | C(0, 9) | −3.5657E−18 |
| | C(0, 2) | 0.001324181 | C(6, 0) | 1.91534E−10 | C(6, 2) | 6.80626E−16 | C(10, 0) | 1.09883E−21 |
| | C(2, 1) | 1.37885E−05 | C(4, 2) | −1.0665E−11 | C(4, 4) | −5.1295E−17 | C(8, 2) | −2.1535E−20 |
| | C(0, 3) | 1.34349E−05 | C(2, 4) | −8.6063E−12 | C(2, 6) | −3.6526E−16 | C(6, 4) | 2.01763E−20 |
| | C(4, 0) | −4.8064E−08 | C(0, 6) | −1.1125E−12 | C(0, 8) | 1.46399E−15 | C(4, 6) | −1.2016E−20 |
| | C(2, 2) | 5.24071E−08 | C(6, 1) | 6.24714E−14 | C(8, 1) | −2.1563E−18 | C(2, 8) | 3.21408E−21 |
| | C(0, 4) | 9.53861E−08 | C(4, 3) | −3.4381E−14 | C(6, 3) | 2.86073E−18 | C(0, 10) | −1.4922E−19 |

In Table 3, designations and values of the coefficients are arranged laterally in sets of frames. The designation is on the left side and the value is on the right side. a set of two numerals separated by a comma and put in parentheses are values of m and n in Expression (2).

In this embodiment, the screen of the display device 11, namely, the object plane, is tilted to the optical axis of the projection lens 2 at an angle of −1.163°. Counterclockwise tilting of a normal to the object plane is positive tilting and clockwise tilting of a normal to the object plane is negative tilting. The angle of −1.163° signifies tilting the object plane clockwise from a position perpendicular to the optical axis of the projection lens 2 through an angle of 1.163°.

The origin of a local coordinate system defining the free curved surface S23 of the free curved mirror 5 is on the optical axis of the projection lens 2. A normal to the free curved mirror 5 at the origin of the local coordinate system aligned with the z-axis of the local coordinate system is turned counterclockwise through an angle of 29°. In FIG. 3, counterclockwise turning is turning through a positive angle and clockwise turning is turning through a negative angle. Thus, a central light ray emerging from the center of the screen of the display device 11 travels substantially along the optical axis of the projection lens 2 is reflected by the free curved surface S23 of the free curved mirror 5 in a direction at an angle twice the inclination of the z-axis, namely, 58°, to the optical axis of the projection lens 2. Suppose that a new optical axis, behind the free curved mirror 5, passing the origin of the coordinate system defining the free curved surface S23 extends in a direction at an angle twice the inclination of the normal to the free curved surface S23 to the optical axis of the projection lens 2, and surfaces lying downstream of the free curved surface S23 are arranged on the new optical axis. An inter-surface distance of −400 indicated in a row indicated by S23# in Table 1 signifies that the origin of a local coordinate system defining a surface S24 is at a distance of 400 mm along the new optical axis to the right from the top of the free curved surface S23. The rest of the surfaces are arranged in conformity with the same rule.

TABLE 4

| Surface | ADE (°) | YDE(mm) |
|---|---|---|
| S0 | −1.163 | 0.0 |
| S23 | 29.000 | 0.0 |
| S24 | −43.000 | 0.0 |
| S25 | 30.000 | 0.0 |

Table 4 shows respective inclinations or eccentricities of local coordinate systems respectively defining the surfaces of the projection optical system in this embodiment. In Table 4, ADE indicates inclination in a plane in FIG. 3 and YDE indicates eccentricity in a plane in FIG. 3 and in a direction perpendicular to the optical axis. Eccentricity in a downward direction in FIG. 3 is positive. In the projection optical system in this embodiment, YDE values are zero, i.e., the surfaces are not eccentric. All the optical elements of the projection optical system in this embodiment are inclined or eccentric in a plane in FIG. 3.

Figure 5:
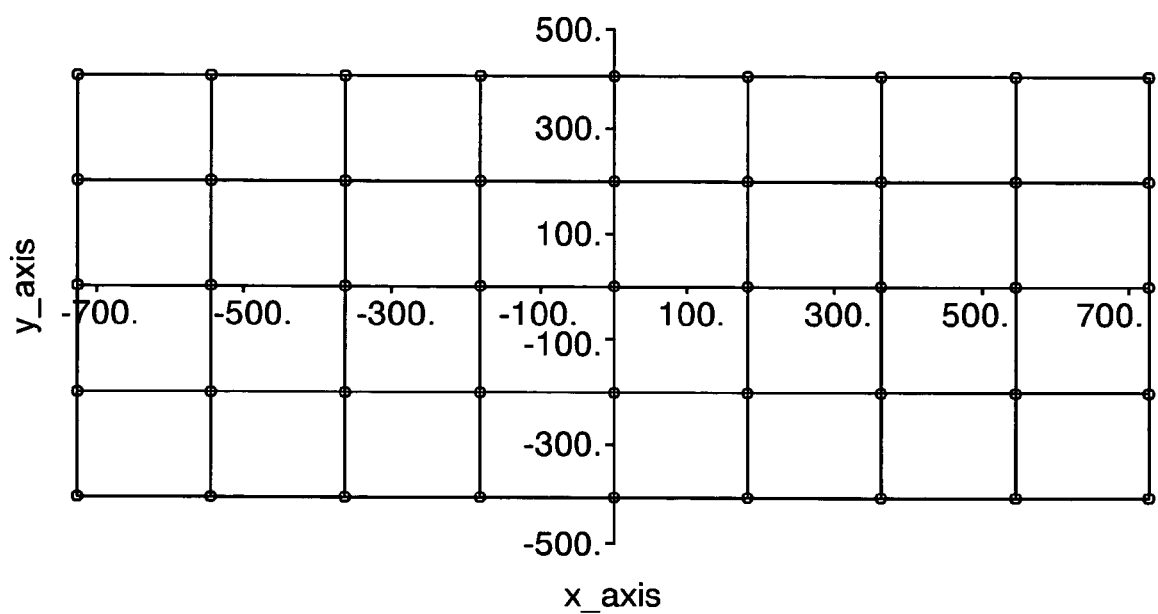
FIG. 5 is a diagram showing a distortion characteristic.
Figure 6:
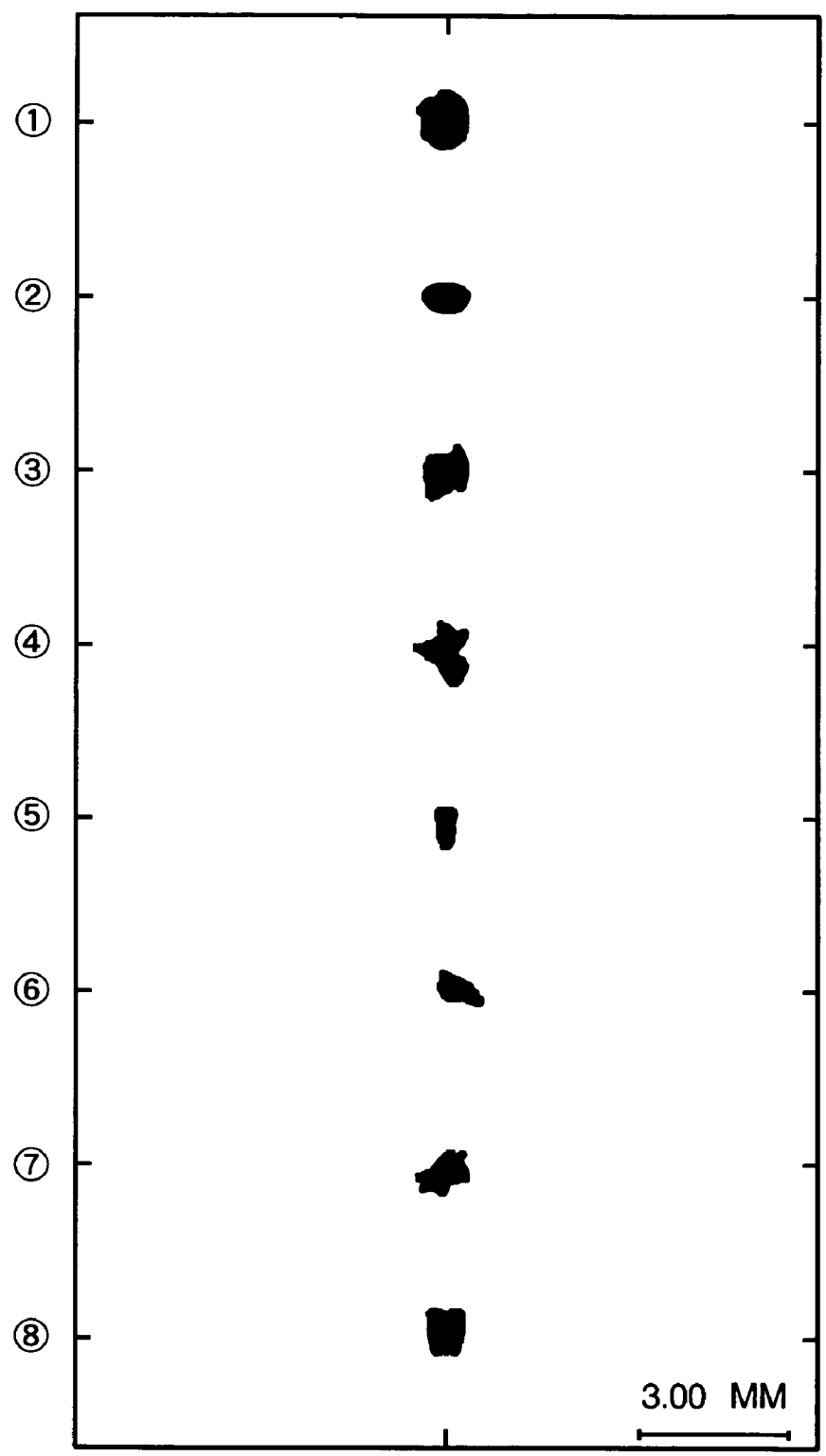
FIG. 6 is a diagrammatic view of assistance in explaining a spot forming ability.

It is known from Tables 1 and 3 that curvature c and conic coefficient k are zero. Trapezoidal distortion resulting from oblique projection is large in the direction of oblique projection and is small in a direction perpendicular to the direction of oblique projection. Therefore, the function of the projection optical system to correct the distortion with respect to the direction of oblique projection needs to be greatly different from that of the same to correct the distortion with respect to a direction perpendicular to the direction of oblique projection. Thus an asymmetric aberration can be satisfactorily corrected without using the curvature c and the conic coefficient k that function in all directions rotationally symmetrically. Numerical values shown in Tables 1 to 4 apply to a case where an image of 16 mm×9 mm on the object plane is projected on the screen 3 in an image of 1452.8 mm×817.2 mm on the image plane. FIG. 5 shows the distortion of the image projected on the screen 3 in the foregoing manner. In FIG. 5, a direction parallel to the y-axis corresponds to a vertical direction in FIG. 3, and a direction parallel to the x-axis is a direction on perpendicular to the y-axis on the screen 3. The center of a rectangle shown in FIG. 5 corresponds to the center of the screen. FIG. 5 indicates a distortion by curves of straight, horizontal lines vertically dividing the rectangle into four divisions and straight, vertical lines horizontally dividing the rectangle into eight divisions. FIG. 6 is a diagram of spots formed on the screen 3 by the projection optical system defined by the numerical data shown in Tables 1 to 4. A top spot to a bottom spot shown in FIG. 6 are those formed by light rays emerged from eight points on the screen of the display device 11, namely, eight points designated by coordinates (8, 4.5), (0.4, 5), (4.8, 2.7), (8, 0), (0, 0), (4.8, −2.7), (8, −4.5 and (0, −4.5), respectively. The unit of the coordinates is millimeter. Horizontal and vertical directions in FIG. 6 correspond to directions parallel to the X-axis and the Y-axis on the screen 3, respectively. The spots are satisfactory with respect to both the directions.

In the projection optical system in this embodiment, the rear lens group 13 of the projection lens 2 includes the rotationally asymmetric free curved lens, and the second optical system includes the rotationally asymmetric free curved mirror 5. The second optical system corrects mainly trapezoidal distortion and the second optical system, namely, the rear lens group 13 of the projection lens 2, corrects mainly asymmetric aberration, such as the distortion of the image plane.

Figure 8:
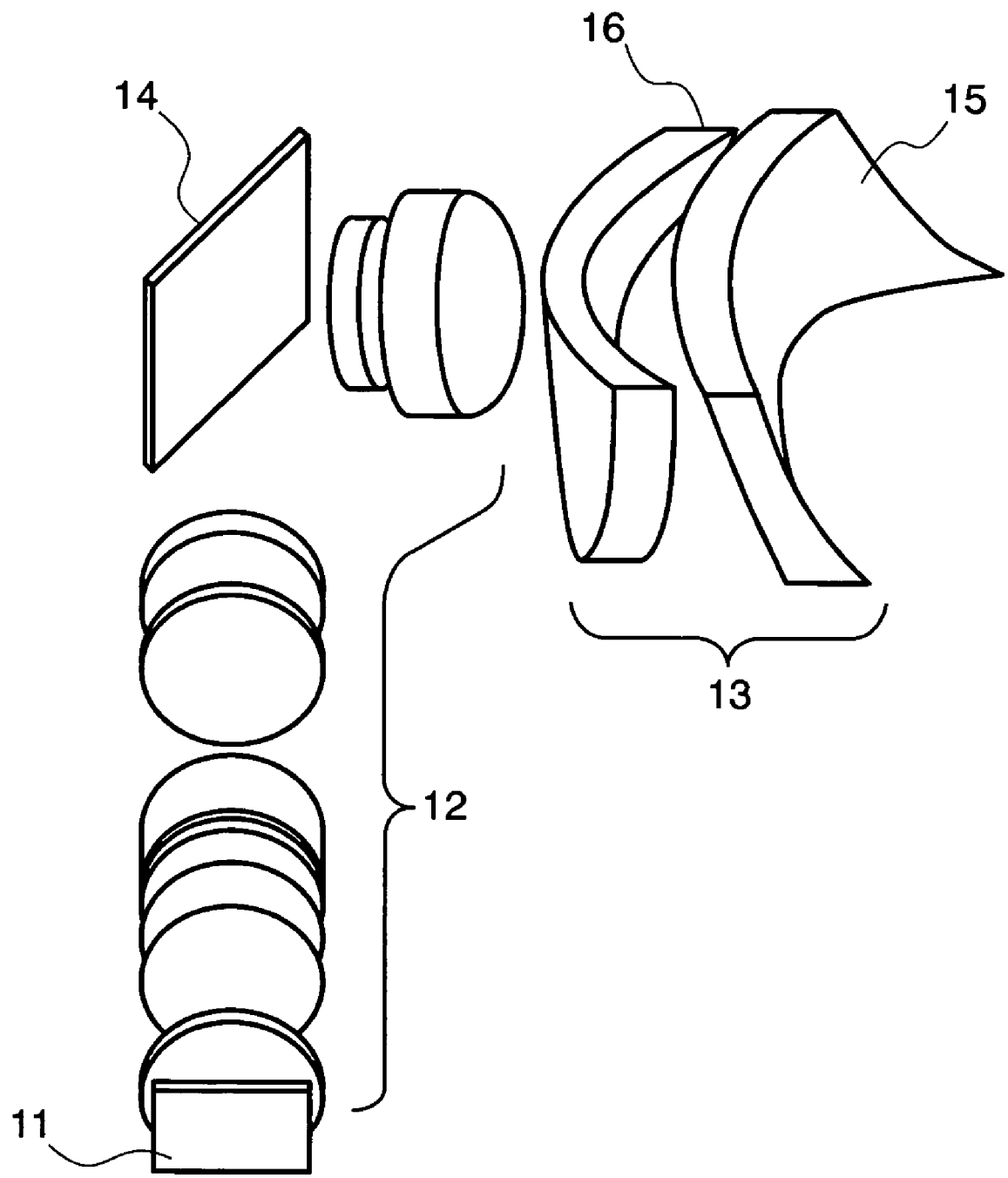
FIG. 8 is a diagrammatic perspective view of a projection optical system.

FIG. 8 shows the component lenses of the projection lens 2 included in the projection optical system, in which a lens barrel for holding the component lenses is not shown. The front lens group 12 of the projection lens 2 is a main lens unit for projecting the screen of the display device 11 on the screen, not shown. The front lens group 12 includes the plurality of refracting lenses respectively having rotationally symmetric surfaces and corrects basic aberrations caused by a rotationally symmetric optical system. The rear lens group 13 of the projection lens 2 includes the rotationally asymmetric free curved lens and corrects mainly aberrations resulting from oblique projection.

As shown in FIG. 8, at least one of the free curved lenses of the projection optical system in this embodiment has a concave exit surface. A lower part, through which light traveling toward a lower part of the screen 3, of the free curved lens has a curvature greater than that of an upper part, through which light traveling toward an upper part of the screen, of the free curved lens. The rear lens group 13 of the projection lens 2 includes the two free curved lenses in combination. A deflecting mirror 14 is disposed between the adjacent lenses of the front lens group 12.

The lenses of an image forming optical system of the related art are fixedly held at predetermined positions, respectively, in a concentric lens barrel. Since the plurality of lenses of the image forming optical system have rotationally symmetric surfaces, respectively, it is natural that the lens barrel is concentric with the lenses. The plastic lenses among the lenses of the image forming optical system repeatedly expand and contract according to changes in temperature and humidity. Acrylic resins, such as polymethyl methacrylate resins (PMMA resins), which are often used for forming those lenses, are likely to extend upon moisture absorption. Therefore, a lens barrel for holding plastic lenses is provided with means for absorbing the expansion and contraction of the lenses. A plastic lens barrel is formed so as to be deformable and a metal lens barrel is provided with elastically deformable spacers respectively surrounding the lenses to hold the lenses in alignment with the optical axis regardless of the expansion and contraction of the plastic lenses.

In the projection optical system in this embodiment, the rear lens group 13 of the projection lens 2 includes the rotationally asymmetric free curved lenses as shown in FIG. 8 and those rotationally asymmetric free curved lenses are plastic lenses. Therefore, those rotationally asymmetric free curved lenses cannot be held in a cylindrical lens barrel or a lens barrel consisting of concentric cylinders. The rear lens group 13 corrects mainly aberration resulting from oblique projection. Therefore, the lenses of the rear lens group 13 are not necessarily held in alignment with the optical axis like the rotationally symmetric lenses of the front lens group 12, which corrects basic aberration, of the projection lens 2.

Figure 9:
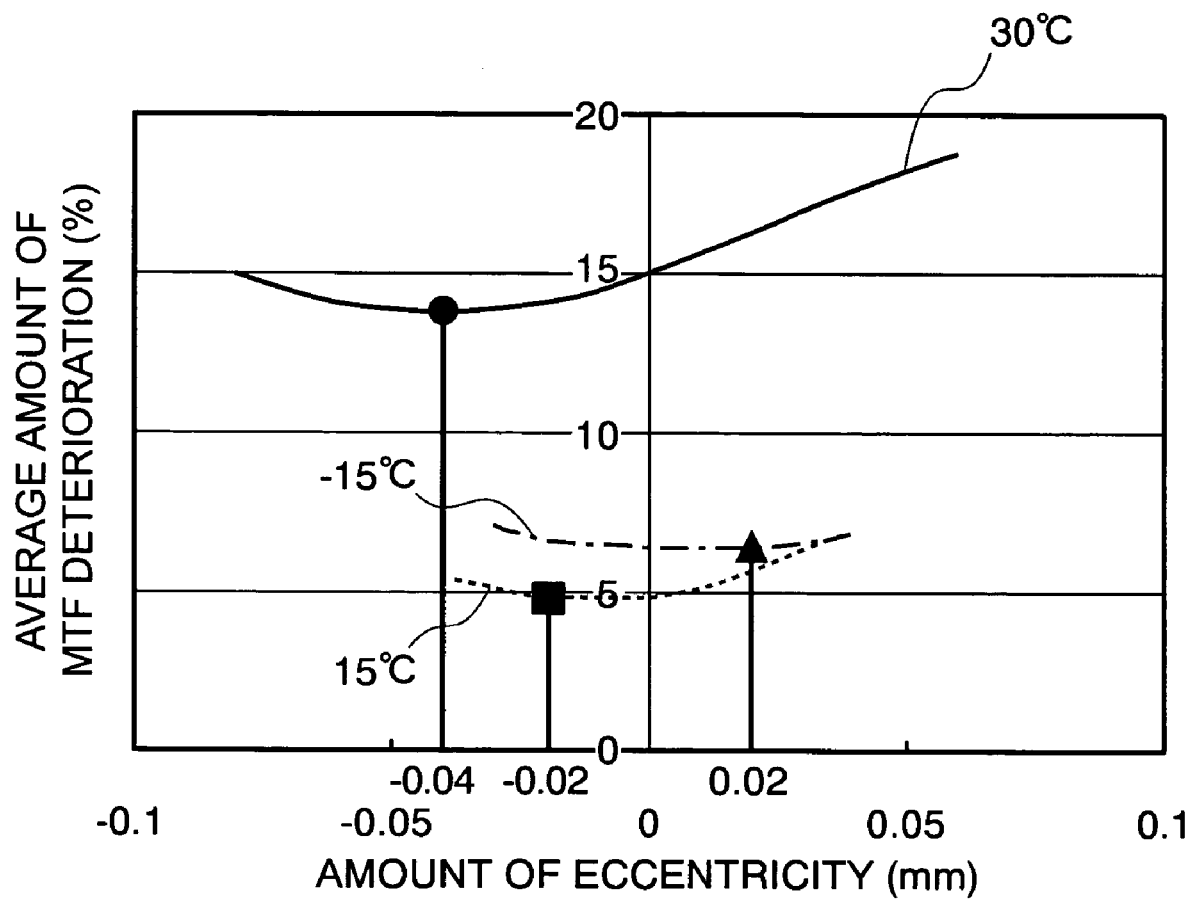
FIG. 9 is a graph of assistance in explaining the deterioration of focusing ability of a projection lens due to temperature change.

FIG. 9 shows the deterioration of the focusing ability MTF of the projection lens 2 resulting from temperature change. In FIG. 9, eccentricity along the Y-axis is measured on the horizontal axis. In FIG. 9, a continuous line, a broken line and a chain line indicate variations of eccentricity when the temperature increased by 30° C., when the temperature increased by 15° C. and the temperature decreased by 15° C., respectively. FIG. 9 shows data on the free curved lens 15 of the rear lens group 13 of the projection lens 2 shown in FIG. 8. The free curved lens 16 of the rear lens group 13 or the free curved mirror 5 of the second optical system has a temperature characteristic similar to that of the free curved lens 15 shown in FIG. 9. The deterioration of MTF of the projection lens that corrects the basic aberration caused by the rotationally symmetric optical system is a minimum when eccentricity is zero. As shown in FIG. 9, the deterioration of MTF of the rotationally asymmetric free curved lens that corrects the aberration resulting from oblique projection is a minimum when eccentricity is other than zero. The deterioration of the MTF is a minimum at an eccentricity of −0.04 mm when the temperature change is 30° C., at an eccentricity of 0.02 mm when the temperature change is 15° C. and at an eccentricity of 0.02 mm when the temperature change is −15° C. The height, namely, the dimension along the Y-axis, of the free curved lens 15 increases by 0.088 mm when the temperature rises 30° C. Theoretically, a reference point for measuring expansion is at the center of the lens. Therefore, the dimension of the lens changes by half the total expansion in each of opposite directions from the center of the lens and hence the upper end surface of the lens is used as a reference surface and the lens is allowed to expand and contract relative to the reference surface to displace the lens by 0.04 mm when the temperature change is 30° C.

FIG. 10(a) is a top view of the free curved lens 15 shown in FIG. 8 and FIG. 10(b) is a front elevation of the free curved lens 15. The free curved lens 15 has a lens body having an exit surface 20, and fringing parts 17 connected to the opposite ends of the lens body by connecting parts 19, respectively. Light rays effective in forming an image on the screen 3 pass through the lens body. The fringing parts 17 are used for holding the free curved lens 15 and for measurement. The upper surfaces 18 of the connecting parts 19 are the horizontal reference surfaces of the free curved lens 15. As shown in FIG. 10(b), the fringing parts 17 have the shape of a segment of a circle having its center on the optical axis of the free curved lens 15.

Generally, a plastic lens is made by molding a plastic material in a mold. The surfaces of the plastic lens are deformed during a molding process by the expansion or contraction of the plastic lens and a stress induced therein. Therefore, the shapes of the surfaces of the plastic lens are not necessarily identical with the corresponding surfaces of the mold. Accordingly, the molding surfaces of the mold are corrected by additional machining process so that the accuracy of the surfaces of the molded plastic lens is within a predetermined range. A correction by which the mold needs to be corrected is the difference between a design shape and a measured shape. Therefore, the shape of the surface of the molded plastic lens needs to be accurately measured. The rear lens group 13 of the projection lens 2 in this embodiment includes the free curved lenses. Accurate measurement of the surfaces of the free curved lens cannot be achieved unless the free curved lens has a reference surface for measurement. Suppose that the free curved lens has a rectangular outline as shown in FIG. 8. Then, the molded, plastic free curved lens is distorted such that an upper part and a lower part thereof are greatly asymmetric. Therefore, a large error is introduced into a measurement of a central part of the free curved surface of the free curved lens when the upper and the lower part of the free curved lens are used to define the central part.

Therefore, the free curved lens 15 of the present invention is provided with the fringing parts 17 having the shape of a circular arc and the reference surfaces 18. As shown in FIG. 10(b), the fringing parts 17 have the shape of apart of a circle. The fringing parts 17 do not need to be formed in the shape of an entire circle. The fringing parts 17 needs to have the shapes of diametrically opposite segments of a circle having its center on the optical axis of the free curved lens 15. The fringing parts 17 have a thickness parallel to the optical axis. The circle circumscribing the fringing parts 17 is perpendicular to the optical axis. Each horizontal reference surface 18 is formed at least on either of the upper and the lower end of the connecting part 19 connecting the fringing part 17 to the lens body of the free curved lens 15. The horizontal reference surfaces 18 are parallel to the optical axis of the free curved lens 15. The horizontal reference surfaces 18 will be described with reference to FIG. 12. The respective origins of coordinate systems designating points on the entrance and the exit free curved surface of the free curved lens 15 are on the optical axis of the free curved lens 15. The X-, the Y- and the Z-axis of the coordinate system designating points on the entrance surface of the free curved lens 15 and those of the coordinate system designating points on the exit surface of the same are parallel to each other. The Z-axes of the coordinate systems are parallel to the optical axis. First, the shape of the circle having parts coinciding with the outlines of the fringing parts is measured to define a plane perpendicular to the optical axis of the free curved lens 15 before measuring the free curved surfaces. The positions of the origins of the coordinate systems designating points on the free curved surfaces can be determined with reference to the center of the circle having parts coinciding with the outlines of the fringing parts 17. When the entrance and the exit surface of a free curved lens are free curved surfaces, respectively, it is preferable that circles circumscribing the fringing parts 17 have the same radius because such a free curved lens can be securely held in a cylindrical lens barrel.

Figure 11:
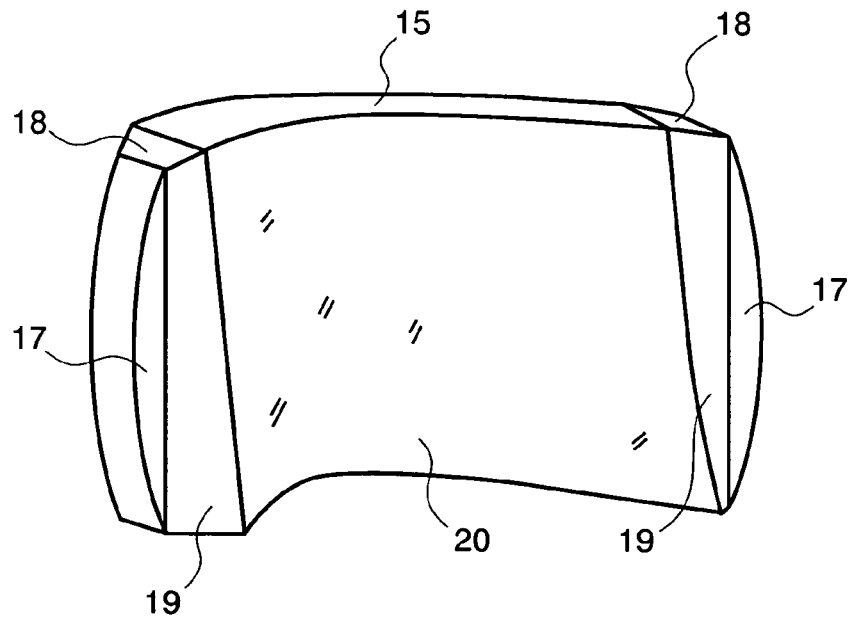
FIG. 11 is a perspective view of the free curved lens shown in FIG. 10(a)
Figure 12:
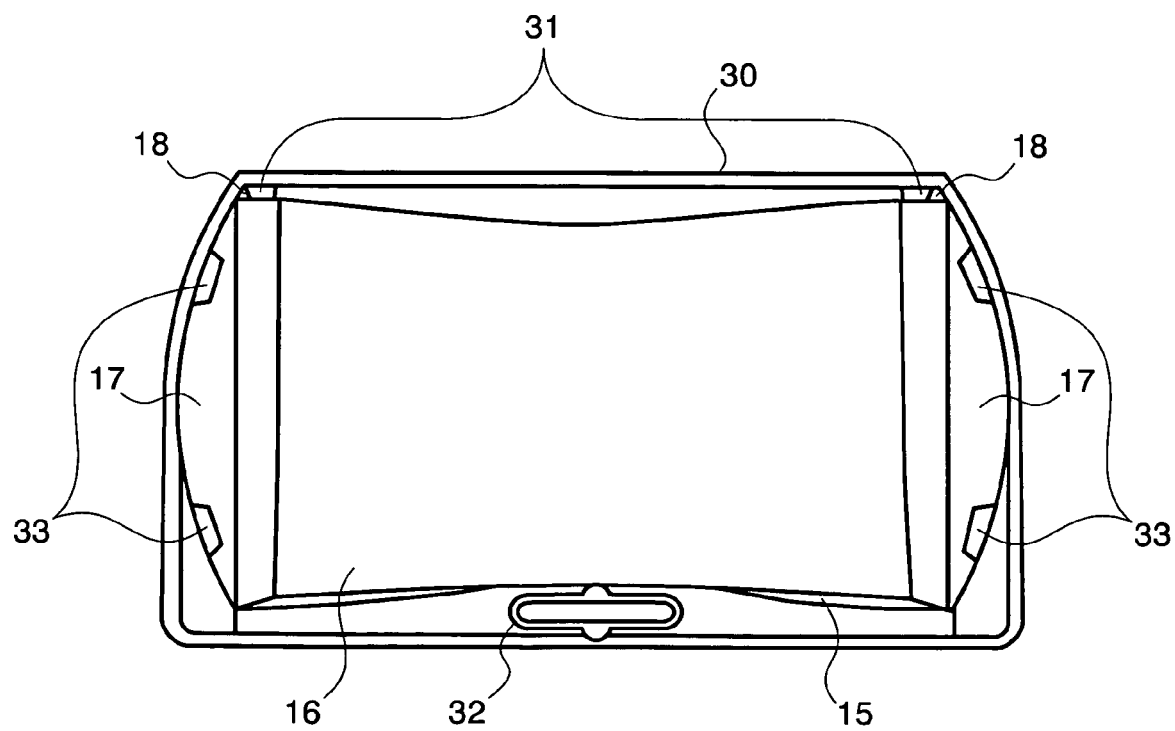
FIG. 12 is a front elevation of a lens barrel fixedly holding the free curved lens shown in FIG. 10(a)

FIG. 12 is a front elevation of the free curved lens 15 shown in FIGS. 10 and 11 fixedly held in a lens barrel 30. FIG. 12 shows a cross section of the lens barrel 30. The side walls of the lens barrel 30 are in contact with respective upper halves of the fringing parts 17 of the free curved lens 15. A conventional lens barrel is in contact with the entire circular edge part of a free curved lens to align the free curved lens with the optical axis. The lens barrel 30 of the present invention in contact with only the upper halves of the fringing parts 17 cannot hold the free curved lens 15 in alignment with the optical axis. The lens barrel 30 is provided with a lens holding parts 31 that come into contact with the horizontal reference surfaces 18 of the free curved lens 15. A lens holding spring 32 is interposed between a middle part of the bottom wall of the lens barrel 30 and a middle part of the lower surface of the free curved lens 15. The lens holding spring 32 presses the free curved lens 15 to bring the horizontal reference surfaces 18 of the free curved lens 15 into contact with the lens holding parts 31. Thus the lens barrel 30 holds the free curved lens 15 correctly in place at three points. The free curved lens 15 may be provided with two horizontal reference surfaces on either of the upper and the lower side thereof. Two reference surfaces may be formed on the upper and the lower side, respectively, of the free curved lens 15 and one lens holding spring may be interposed between a middle part of either the right or the left side of the free curved lens 15 and the side wall of the lens barrel 30.

The lens barrel 30 is provided with lens holders 33 to fix the free curved lens 15 with respect to directions perpendicular to the optical axis. The horizontal reference surfaces 18 define a horizontal plane parallel to the optical axis. When the origin of the coordinate system designating points on the free curved surface is determined from the position of the center of the fringe and the horizontal plane is determined, the shape of the free curved surface of the free curved lens 15 can be accurately measured. The free curved lens 15 can be accurately fixed to the barrel 30.

When the free curved lens 15 thus fixed to the lens barrel 30 is subjected to changes in temperature and humidity, the free curved lens 15 expands or contracts relative to the horizontal reference surfaces 18, the deterioration of the focusing ability can be limited to the least extent.

Although the description of the free curved lens 15 of the rear lens group 13 of the projection lens 2 has been described, the foregoing matters relating with the free curved lens 15 apply also to the other free curved lens 16 of the rear lens group 13 and the free curved mirror 5 of the second optical system. Shape of the fringing parts 42 of the free curved lens 16 of the rear lens group 13 of the projection lens 2 will be described.

Figure 14:
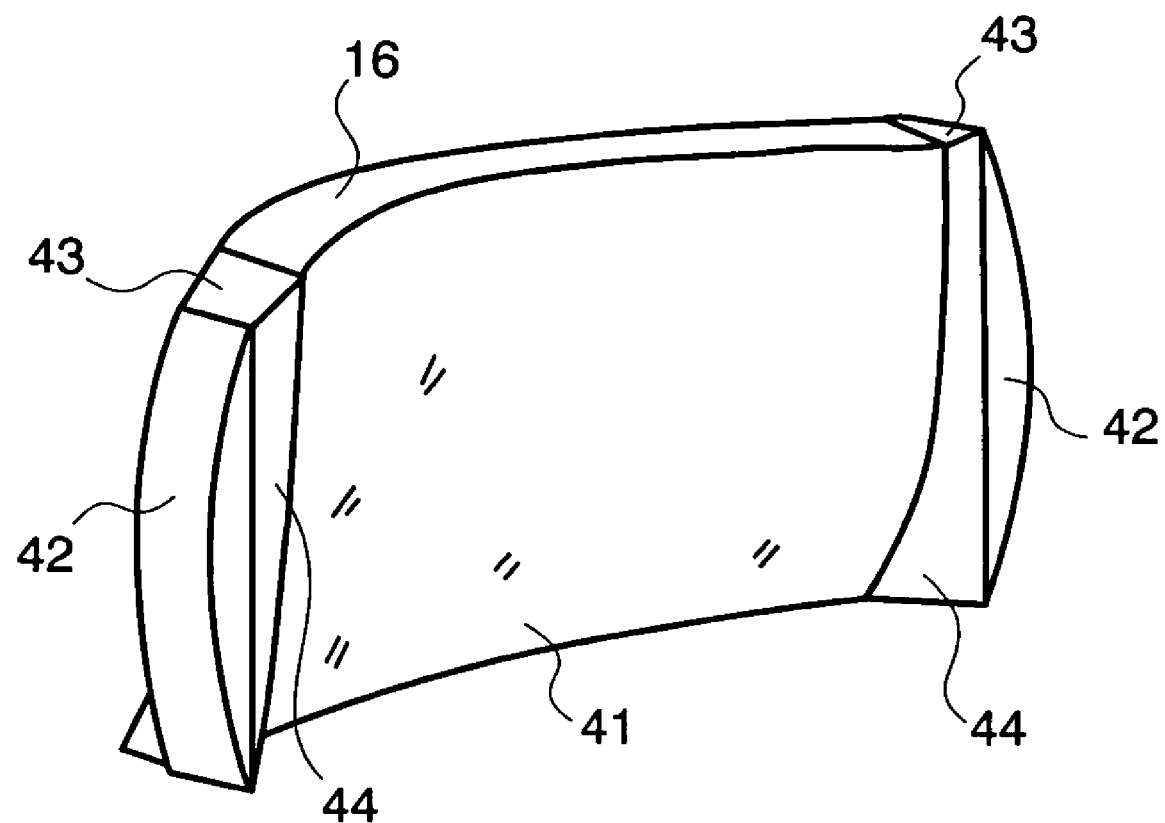
FIG. 14 is a perspective view of the free curved lens shown in FIG. 13(a)

FIG. 13(a) is a top view of the free curved lens 16 of the rear lens group 13 of the projection lens 2, FIG. 13(b) is a front elevation of the free curved lens 16 and FIG. 14 is a perspective view of the free curved lens 16. Referring to FIGS. 13 and 14, the free curved lens 16 has a lens body having an exit surface 41, fringing parts 42, connecting parts 44 connecting the fringing parts 42 to the lens body. The upper or the lower end surface of each connecting part 44 is a horizontal reference surface 43. As obvious from FIG. 13(b), the fringing parts 42 have the shape of a segments of a circle having its center on the optical axis of the free curved lens 16.

As shown in FIG. 13 (b) in a front elevation, the outlines of the fringing parts 42 are circular arcs of a circle perpendicular to the optical axis of the free curved lens 16 and having its center of the same optical axis. The respective origins of coordinate systems designating points on the entrance and the exit free curved surface of the free curved lens 16 are on the optical axis of the free curved lens 16. The Z-axes of the coordinate systems are parallel to the optical axis of the free curved lens 16. A plane perpendicular to the optical axis of the free curved lens 16 is determined on the basis of the outlines of the fringing parts 42, and the origins of the coordinate systems designating points on the free curved surfaces are determined on the basis of the position of the center of the circle circumscribing the fringing parts 42. As shown in FIGS. 13 and 14, a horizontal plane is determined on the basis of the horizontal reference surfaces 43 on the upper side of the free curved lens 16. Thus all the axes of the coordinate systems can be determined and the shapes of the free curved surfaces of the free curved lens 16 can be accurately measured. Thus the free curved lens 16 can be accurately fixed to the lens barrel. When the free curved lens 16 is provided with fringing parts wider than the fringing parts 42, the plane perpendicular to the optical axis and the origins of the coordinate systems can be more accurately determined.

Figure 16:
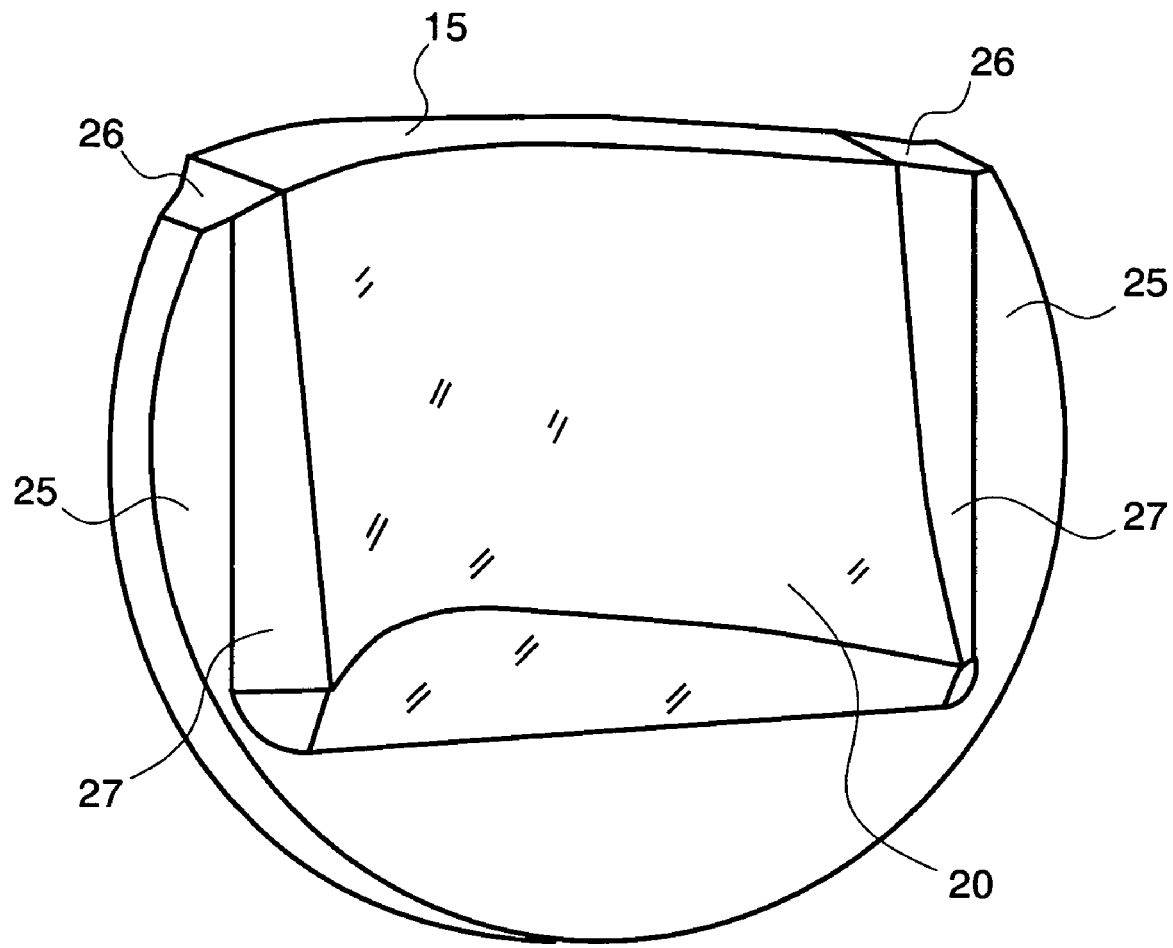
FIG. 16 is a perspective view of the free curved lens shown in FIG. 15(a).

FIGS. 15(a), 15(b) and 16 are a top view, a front elevation and a perspective view, respectively, of a free curved lens 15 included in a rear lens group 13 included in a projection lens 2 included in a projection display in a second embodiment according to-the present invention. The free curved lens 15 has a lens body and is provided with a lower fringing part connected to the lower side of the lens body in addition to side fringing parts 25 connected to the opposite lateral sides of the lens body. As obvious from FIG. 15, although any fringing part cannot be formed on the upper side of the free curved lens 15 because light rays traveling toward a screen pass near the upper side of the free curved lens 15, the lower fringing part can be formed on the lower side of the free curved lens 15. The free curved lens 15 shown in FIGS. 15 and 16 have an exit surface 20 identical with that of the free curved lens 15 included in the first embodiment shown in FIGS. 10 and 11. The side fringing parts 25 are connected to the lens body by connecting parts 27 having upper end surfaces serving as horizontal reference surfaces 26. As obvious from FIG. 15 (b), the side fringing parts 25 are segments of a circle having its center on the optical axis of the free curved lens 15.

As shown in FIG. 15 (b), the outlines of the side fringing parts 25 are circular arcs of a circle perpendicular to the optical axis of the free curved lens 15 and having its center on the same optical axis. The sum of the outlines of the side fringing parts 25 and the lower fringing part is substantially equal to about ⅔ of the circumference of the circle. The side fringing parts 25 and the lower fringing part are continuous and form a single fringing part having an outline equal to about ⅔ of the circumference of the circle. This single fringing part can hold the free curved lens 15 in alignment with the optical axis of the projection lens 2.

The respective origins of coordinate systems designating points on the entrance and the exit free curved surface of the free curved lens 15 are on the optical axis of the free curved lens 15. The Z-axes of the coordinate systems are parallel to the optical axis of the free curved lens 15. A plane perpendicular to the optical axis of the free curved lens 15 is determined on the basis of the circle circumscribing the fringing parts 25, and the origins of the coordinate systems designating-points on the free curved surfaces are determined on the basis of the position of the center of the circle circumscribing the fringing parts 25. As shown in FIGS. 15 and 16, a horizontal plane is determined on the basis of the horizontal reference surfaces 26 on the upper side of the free curved lens 15. Thus all the axes of the coordinate systems can be determined and the shapes of the free curved surfaces of the free curved lens 15 can be accurately measured. Thus the free curved lens 15 can be accurately fixed to a lens barrel.

The shapes of the fringing parts of those three type of the free curved lenses determines the circle for determining the origins of the coordinate systems and the horizontal reference surfaces. Vertical reference surfaces may be formed instead of the horizontal reference surfaces. The free curved lens may be provided with a flat part parallel to the optical axis of the free curved lens and parallel to either of the two coordinate axes perpendicular to the optical axis of the coordinate system designating points on the free curved surface in a part thereof other than the fringing parts circumscribed by the circle. However, since the free curved surfaces of the free curved lenses employed in the present invention are asymmetrical with respect to a horizontal axis and are symmetrical with respect to a vertical axis, the horizontal reference surfaces are preferable to hold the free curved lens accurately on the lens barrel.

Although the invention has been described as applied to the projection optical system that projects an image upward in an oblique projection mode from a position below the screen 3, the projection optical system may project an image downward in an oblique projection mode from a position above the screen 3. When the projection optical system projects an image downward, the shapes of the fringing parts are inverted. When the projection optical system projects an image laterally in an oblique projection mode from the right side of the screen 3, the fringing parts are formed such that the lower parts thereof face the right side. When the projection optical system projects an image laterally in an oblique projection mode from the left side of the screen 3, the fringing parts are formed such that the lower parts thereof face the left side. That is, the horizontal reference surfaces of the fringing parts of the foregoing lens are perpendicular to a plane defined by a main light beam that falls on the center of the screen 3 and the optical axis of the lens.

Although the projection optical system in the foregoing embodiment is provided with both a free curved lens and a free curved mirror, the projection optical system may be provided with a spherical or a spherical mirror instead of the free curved mirror.

Although the present invention has been described as applied to the projection display including the screen, the present invention is applicable also to a front projection display not including any screen.

In the foregoing embodiment, the origin of the coordinate system designating points on the free curved surface is on the optical axis of the free curved lens and the center of the circle circumscribing the fringing parts is on the optical axis of the free curved lens. If the origin of the coordinate system is not on the optical axis, it is desirable that the origin of the coordinate system coincides with the center of the circle circumscribing the fringing parts.

As apparent from the foregoing description, the present invention is capable of reducing trapezoidal distortion resulting from oblique projection of an image and/or aberration, of displaying a satisfactory image and of forming the projection display in compact construction.

FIG. 7
1 . . . Section in a vertical plane, 2 . . . Section in a horizontal plane
FIG. 9
1 . . . Mean MTF deterioration (%), 2 . . . Eccentricity (mm)

What is claimed is:
1. A projection display comprising:
a display device having a screen;
a first optical system including a plurality of transmission lenses for enlarging an image displayed on the screen of the display device; and a second optical system for reflecting light traveled through the first optical system to project the image at a predetermined angle;

wherein the first optical system includes a rotationally asymmetric optical lens having fringing parts circumscribed by a circle having the center on an optical axis of the rotationally asymmetric optical lens, and wherein the rotationally asymmetric optical lens has an exit surface, a part that reflects light toward a lower part of the screen has a curvature greater than that of a part that reflects light toward an upper part of the screen.

2. The projection display according to claim 1 further comprising a lens barrel, for holding the rotationally asymmetric optical lens, having at least a part having a cylindrical inside surface of a radius equal to that of the circle circumscribing the fringing parts of the rotationally asymmetric optical lens.

3. The projection display according to claim 2, wherein the rotationally asymmetric optical lens has a plurality of flat surfaces parallel to the optical axis in parts of the circumference, and the lens barrel is provided with a plurality of holding surfaces with which the flat surfaces of the rotationally asymmetric optical lens come into parallel contact and a holding spring.

4. The projection display according to claim 1, wherein the rotationally asymmetric optical lens has fringing parts formed opposite to each other with respect to the optical axis and having a shape resembling a circular arc.

5. The projection display according to claim 2, wherein the first optical system is a projection optical system having a front lens group including rotationally symmetric lenses, and a rear lens group including the rotationally asymmetric optical lens.

6. A projection display comprising:
a light source;
an image forming device capable of forming an image to be displayed on the basis of image signals generated by modulating light emitted by the light source;
a first optical system including a plurality of transmission lenses for enlarging the image to be displayed on a screen; and
a second optical system for reflecting light traveled through the first optical system to project an enlarged image to be displayed on the screen at a predetermined angle;
wherein at least one of the plurality of transmission lenses is rotationally asymmetric optical lens, in which at least either an exit surface or an entrance surface is a free curved surface, having fringing parts circumscribed by a circle having the center on an optical axis of the free curved surface and having thickness parallel to the optical axis, and
wherein the rotationally asymmetric optical lens has the exit surface, a part that reflects light toward a lower part of the screen has a curvature greater than that of a part that reflects light toward an upper part of the screen.

7. The projection display according to claim 6, wherein the rotationally asymmetric optical lens has fringing parts formed opposite to each other with respect to the optical axis and having outlines of a shape resembling a circular arc.

8. The projection display according to claim 6 further comprising a lens barrel, for holding the rotationally asymmetric optical lens, having at least a part having a cylindrical inside surface of a radius equal to that of the circle circumscribing the fringing parts of the rotationally asymmetric optical lens.

9. The projection display according to claim 8, wherein the rotationally asymmetric optical lens has a plurality of flat surfaces parallel to the optical axis in parts of the circumference, and the lens barrel is provided with a plurality of holding surfaces with which the flat surfaces of the rotationally asymmetric optical lens come into parallel contact and a holding spring.

10. The projection display according to claim 6, wherein the rotationally asymmetric optical lens has fringing parts formed opposite to each other with respect to the optical axis and having outlines of a shape resembling a circular arc.

11. The projection display according to claim 8, wherein the first optical system is a projection optical system having a front lens group including rotationally symmetric lenses, and a rear lens group including the rotationally asymmetric optical lens.

12. A transmission lens having an entrance surface on which incident light falls and an exit surface from which emergent light emerges;
wherein at least either of the entrance and the exit surface is a rotationally asymmetric free curved surface, and fringing parts are formed on the fringe of the free curved surface opposite to each other with respect to an optical axis of the free curved surface and the fringing parts have outlines of a shape resembling a circular arc of a circle having the center on the optical axis of the free curved surface, and
wherein both the entrance surface and the exit surface are free curved surfaces, respectively, and a circle circumscribing the entrance surface has a radius equal to that of a circle circumscribing the exit surface.

13. An optical system for a projection display, said optical system comprising:
a display device;
a first optical system including a projection lens, for projecting an image formed by the display device in an enlarged image on a screen, having a front lens group including a coaxial optical system having surfaces symmetric with respect to an axis passing the center of the display device and a rear lens group including at least one rotationally asymmetric free curved lens having an entrance surface on which incident light falls and an exit surface from which emergent light emerges; and
a second optical system, for reflecting light traveled through the first optical system to project the image obliquely on the screen, including a free curved mirror having at least one free curved surface;
wherein the rotationally asymmetric free curved lens of the first optical system has an outline circumscribed by a circle perpendicular to the optical axis of the rotationally asymmetric free curved lens and having the center on the optical axis of the rotationally asymmetric free curved lens, and
wherein both the entrance surface and the exit surface are free curved surfaces, respectively, and a circle circumscribing the entrance surface has a radius equal to that of a circle circumscribing the exit surface.

14. An optical system for a projection display, comprising:
a first optical system including a front lens group having a plurality of refracting lenses, and a rear lens group including at least one rotationally asymmetric optical lens for enlarging an image to be displayed on a screen; and
a second optical system having a free curved mirror for reflecting light traveled through the first optical system to project the image on the screen at a predetermined angle;
wherein the rotationally asymmetric optical lens of said first optical system has an exit surface, a part that reflects light toward a lower part of the screen has a curvature greater than that of a part that reflects light toward an upper part of the screen.

15. The optical system according to claim 14, wherein the rotationally asymmetric optical lens is concave in a light emitting direction, the free curved mirror is convex in a reflecting direction, and the free curved mirror is a rotationally asymmetric convex mirror.

16. The optical system according to claim 15, wherein the rotationally asymmetric optical lens corrects asymmetrical aberration, including a distortion of an image plane, and the free curved mirror corrects trapezoidal distortion resulting from an oblique projection of the image.

17. The optical system according to claim 14, wherein the plurality of refracting lenses have rotationally symmetric surfaces arranged to correct basic aberrations, the rotationally asymmetric optical lens is a free curved lens arranged to correct asymmetrical aberration, including a distortion of an image plane, and the free curved mirror is arranged to correct trapezoidal distortion resulting from an oblique projection of the image.

* * * * *